United States Patent
Schwartz et al.

(10) Patent No.: US 6,355,093 B1
(45) Date of Patent: Mar. 12, 2002

(54) TWO COMPONENT-THREE DIMENSIONAL CATALYSIS

(75) Inventors: Michael Schwartz; James H. White; Anthony F. Sammells, all of Boulder, CO (US)

(73) Assignee: Eltron Research, INC, Boulder, CO (US)

( * ) Notice: Subject to any disclaimer, the term of this patent is extended or adjusted under 35 U.S.C. 154(b) by 0 days.

(21) Appl. No.: 08/960,182

(22) Filed: Oct. 29, 1997

Related U.S. Application Data

(63) Continuation-in-part of application No. 08/639,781, filed on Apr. 29, 1996, now Pat. No. 6,033,632, which is a continuation-in-part of application No. 08/163,620, filed on Dec. 8, 1993, now abandoned.

(51) Int. Cl.[7] .............................. B01J 35/00; B01J 8/04; B01D 59/12
(52) U.S. Cl. ........................ 95/56; 422/191; 422/222; 210/500.25; 210/510.1; 502/4; 502/60; 502/303; 502/327
(58) Field of Search .............................. 95/56; 422/190, 422/191, 222; 210/500.25, 502.1, 510.1; 427/244–246; 502/4, 60, 302–311, 325–328

(56) References Cited

U.S. PATENT DOCUMENTS

| | | | |
|---|---|---|---|
| 3,607,863 A | 9/1971 | Dosch | 502/150 |
| 3,754,951 A | 8/1973 | Coatney | 501/112 |
| 4,083,730 A | 4/1978 | Kwech et al. | 106/679 |
| 4,330,633 A | 5/1982 | Yoshiato et al. | 501/152 |
| 4,791,079 A | 12/1988 | Hazbun | 585/443 |
| 4,793,904 A | 12/1988 | Mazanec et al. | 204/59 |
| 4,802,958 A | 2/1989 | Mazanec et al. | 204/80 |
| 4,827,071 A | 5/1989 | Hazbun | 585/443 |
| 4,933,054 A | 6/1990 | Mazanec et al. | 204/80 |
| 5,160,713 A | 11/1992 | Mazanec et al. | 423/210 |

(List continued on next page.)

FOREIGN PATENT DOCUMENTS

| | | |
|---|---|---|
| EP | 90305684.4 | 11/1990 |
| EP | 673 675 | 9/1995 |
| EP | 705 790 | 4/1996 |
| EP | 766 330 | 4/1997 |
| EP | 438 902 | 5/1997 |
| GB | 2203446 | 3/1988 |
| WO | 94/24065 | 10/1994 |
| WO | 97/41060 | 11/1997 |

OTHER PUBLICATIONS

U.S. application No. 09/286,829, Mackay et al., filed Apr. 6, 1999.
U.S. application No. 09/314,708, Van Calcar et al., filed May 19, 1999.

(List continued on next page.)

Primary Examiner—Chester T. Barry
(74) Attorney, Agent, or Firm—Greenlee, Winner and Sullivan, P.C.

(57) ABSTRACT

This invention relates to catalytic reactor membranes having a gas-impermeable membrane for transport of oxygen anions. The membrane has an oxidation surface and a reduction surface. The membrane is coated on its oxidation surface with an adherent catalyst layer and is optionally coated on its reduction surface with a catalyst that promotes reduction of an oxygen-containing species (e.g., $O_2$, $NO_2$, $SO_2$, etc.) to generate oxygen anions on the membrane. The reactor has an oxidation zone and a reduction zone separated by the membrane. A component of an oxygen containing gas in the reduction zone is reduced at the membrane and a reduced species in a reactant gas in the oxidation zone of the reactor is oxidized. The reactor optionally contains a three-dimensional catalyst in the oxidation zone. The adherent catalyst layer and the three-dimensional catalyst are selected to promote a desired oxidation reaction, particularly a partial oxidation of a hydrocarbon.

34 Claims, 4 Drawing Sheets

U.S. PATENT DOCUMENTS

| | | | |
|---|---|---|---|
| 5,210,059 A | 5/1993 | Matturo et al. | 502/4 |
| 5,240,480 A | 8/1993 | Thorogood et al. | 96/4 |
| 5,306,411 A | 4/1994 | Mazanec et al. | 204/266 |
| 5,356,728 A | 10/1994 | Balachandran et al. | 428/8 |
| 5,397,541 A | 3/1995 | Post | 427/78 |
| 5,534,471 A | 7/1996 | Carolan et al. | 502/4 |
| 5,569,633 A | 10/1996 | Carolan et al. | 502/4 |
| 5,573,737 A * | 11/1996 | Balachandran | |
| 5,591,315 A | 1/1997 | Mazanec et al. | 205/462 |
| 5,639,437 A | 6/1997 | Balachandran et al. | 423/593 |
| 5,648,304 A | 7/1997 | Mazanec et al. | 501/134 |
| 5,693,212 A | 12/1997 | Mazanec et al. | 205/462 |
| 5,702,999 A | 12/1997 | Mazanec et al. | 501/152 |
| 5,712,220 A | 1/1998 | Carolan et al. | 502/400 |
| 5,714,091 A | 2/1998 | Mazanec et al. | 252/373 |
| 5,723,035 A | 3/1998 | Mazanec et al. | 204/295 |
| 5,744,015 A | 4/1998 | Mazanec et al. | 204/295 |
| 5,779,904 A | 7/1998 | Ruderman et al. | 210/500 |
| 5,788,748 A | 8/1998 | Mazanec et al. | 96/4 |
| 5,817,597 A | 10/1998 | Carolan et al. | 502/400 |
| 5,821,185 A | 10/1998 | White et al. | 502/4 |
| 5,846,641 A * | 12/1998 | Abeles | |
| 6,033,632 A * | 3/2000 | Schwartz | |
| 6,146,549 A | 11/2000 | Mackay et al. | 252/373 |

OTHER PUBLICATIONS

U.S. application No. 09/366,824, Mackay et al., filed Aug. 4, 1999.

U.S. application No. 09/399,582, Schutz et al., filed Sep. 20, 1999.

Saracco, et al, "Catalytic Inorganic Membrane Reactors: Present Experience and Future Opportunities," Catalysis Reviews Science and Engineering, 36(2) (1994): p. 305–384.*

The Periodic Table of Elements, IUPAC (1983).

Teraoka, Y. et al. (1988), "Mixed Ionic–Electronic Conductivity of $La_{1-x}Sr_xCo_{1-y}Fe_yO_{3-\delta}$ Perovskite–type Oxides," Mat. Res. Bull. 23:51–58.

Teraoka, Y. et al. (1985), "Oxygen Permeation Through Perovskite–Type Oxides," Chem. Lett., pp. 1743–1746.

Teraoka, Y. et al. (1988), "Effect of Cation Substitution on the Oxygen Semipermeability of Perovskite–type Oxides," Chem. Lett., pp. 503–506.

Matsumoto, Y. et al. (1980), "Oxygen Evolution on $La_{1-x}Sr_xFe_{1-y}Co_yO_3$ Series Oxides," J. Electrochemical. Soc.: Electyrochem. Sci and Technol., 127(11):2360–2364.

Goodenough, J.B. et al. (1990), "Oxide–ion conduction in $Ba_2In_2O_5$ and Ba3In2MO8 (M=Ce, Hf, or Zr)," Solid State Ionics 44:21–31.

Zhen, Y.S. and Goodenough, J.B. (1990), "Oxygen–ion Conductivity in $Ba_8In_6O_{17}$," Mat. Res. Bull. 25:785–790.

Gallagher, P.K. et al. (1964), "Mössbauer Effect in the System $SrFeO_{2.5-3.0}$," J. Chem. Phys. 41(8):2429–2434.

Greaves, C. et al. (1975), "A Powder Neutron Diffraction Investigation of the Nuclear and Magnetic Structure of $Sr_2Fe_2O_5$," Acta Cryst. B31:641–646.

Sammells, A.F. et al. (1992), "Rational selection of advanced solid electrolytes for intermediate temperature fuel cells," Solid State Ionics 52:111–123.

Cook, R.L. et al. (1991), "On the systematic selection of perovskite solid electrolytes for intermediate temperature fuel cells," Solid State Ionics 45:311–321.

Cook, R.L. et al. (1990), "Perovskite Solid Electrolytes for Intermediate Temperature Solid Oxide Fuel Cells," J. Electrochem. Soc. 137:3309–3310.

Teraoka, Y. et al. (1985), "Oxygen–sorptive Properties of Defect Perovskite–Type $La_{1-x}Sr_xCo_{1-y}Fe_yO_{2\delta}$," Chem. Lett., pp. 1367–1370.

Crespin, M. and Hall, W.K. (1981), "Surface Chemistry of Some Perovskite Oxides," J. Catal. 69:359–370.

Chick, L.A. et al. (1990), "Glycine–nitrate combustion synthesis of oxide ceramic powders," Mater. Lett. 10(1, 2):6–12.

Pederson, L.R. et al. (1991), "Combustion synthesis of $YBa_2CU_3O_{7-x}$: glycine/metal nitrate method," Mater. Lett. 10(9,10):437–443.

van der Pauw, L.J. (1958), "A Method of Measuring Specific Resistivity and Hall Effect of Discs of Arbitrary Shape," Phillips Research Reports 13(1):1–9.

Rostrup–Nielsen, J.R. and Bak Hansen, J–H. (1993), "$CO_2$–Reforming of Methane over Transition Metals," J. Catal. 144:38–49.

Sammells, T., (1991), "Rational Selection of Perovskites for Solid Electrolytes and Electrocatalysis," Presented at BP America Research, Warrenville Research Center, Sep. 16, 1991, 46pp.

Pujare, N U and Sammells, A.F. (1988) J. Electrochem. Soc. 135(10):2544–2545.

Teraoka, Y. et al. (1989) J. Ceram. Soc. Jpn. Inter. Ed. 97:458–462.

Teraoka, Y. et al. (1989) J. Ceram. Soc. Jpn. Inter. Ed. 97:523–529.

Kuchynka, D.J. et al. (1991) J. Electrochem. Soc. 138(5):1284–1299.

Sammells, A.F. and Cook, R.L. (1991), "Rational Selection of Advanced Solid Electrolytes for Intermediate Temperature Fuel Cells," presented at the Ceramic Conductors for Solid–State Electrochemical Devices Meeting, May 12–15, 1991, Snowbird, UT, (abstract only).

Schwartz, M. et al. (1993) J. Electrochem. Soc. 140(4):L62–L63 (Apr.).

* cited by examiner

TWO COMPONENT-THREE DIMENSIONAL CATALYSIS

CROSS-REFERENCE TO RELATED APPLICATIONS

This application is a continuation-in-part of U.S. patent application Ser. No. 08/639,781, filed Apr. 29, 1996, now U.S. Pat. No. 6,033,632, which in turn is a continuation-in-part of U.S. patent application Ser. No. 08/163,620, filed Dec. 8, 1993, abandoned both of which are incorporated in their entirety by reference herein.

This invention was made with government support under DE-FG02-94ER81750, awarded by the Department of Energy. The United States Government has certain rights in this invention.

FIELD OF THE INVENTION

This invention generally relates to catalytic partial and full oxidation of hydrocarbons and related reduced species using catalytic membrane reactors. Reactors containing gas-impermeable, solid state membranes with an adherent catalyst layer in combination with fixed (or packed)-bed catalyst are disclosed. Membrane materials, catalyst layers and packed-bed catalysts are selected to achieve a desired selective oxidation reaction. Catalytic membrane reactions include, among others, the partial oxidation of methane or natural gas to synthesis gas.

BACKGROUND OF THE INVENTION

Catalytic membrane reactors using solid state membranes for the oxidation or decomposition of various chemical species have been studied and used previously. One potentially valuable use of such reactors is in the production of synthesis gas. See, for example, Cable et al. EP patent application 90305684.4 (published Nov. 28, 1990) and Mazanec et al. U.S. Pat. No. 5,306,411. Synthesis gas, a mixture of CO and $H_2$, is widely used as a feedstock in the chemical industry for production of bulk chemicals such as methanol and liquid fuel oxygenates. For most efficient use in the synthesis of methanol, the ratio of $H_2$:CO in synthesis gas should be adjusted to 2:1.

In a catalytic membrane reactor that facilitates oxidation/reduction reactions, a catalytic membrane separates an oxygen-containing gas from a reactant gas which is to be oxidized. Oxygen ($O_2$) or other oxygen-containing species (for example, $NO_x$ or $SO_x$) are reduced at one face of the membrane to oxygen anions that are then transported across the membrane to its other face in contact with the reactant gas.

Materials for membranes in catalytic membrane reactors must be conductors of oxygen anions, and the materials must be chemically and mechanically stable at the high operating temperatures and under the harsh conditions required for reactor operation. In addition, provision must be made in the reactor for electronic conduction to maintain membrane charge neutrality. Electronic conductivity in a reactor is necessary to maintain charge neutrality permitting anion conduction through the membrane. Electron conduction can be achieved by adding an external circuit to a reactor which allows for current flow. See: U.S. Pat. Nos. 4,793,904, 4,802,958 and 4,933,054 (all of Mazanec et al.).

Electronic conductivity can also be achieved by doping oxygen-anion conducting materials with a metal ion, as illustrated by U.S. Pat. Nos. 4,791,079 and 4,827,071 (both of Hazbun), to generate dual (electrons and oxygen anions) conducting materials. The disadvantage of this approach is that the dopant metal ions can act as traps for migrating oxygen anions, inhibiting the ionic conductivity of the membrane.

Dual conducting mixtures can also be prepared by mixing an oxygen-conducting material with an electronically-conducting material to form a composite, multi-component, non-single phase material. Problems associated with this method include possible deterioration of conductivity due to reactivity between the different components of the mixture and possible mechanical instability, if the components have different thermal expansion properties.

The preferred method for obtaining electronic conductivity is to use membrane materials which inherently possess this property.

As described in U.S. patent applications (Parent and Grandparent to this case), mixed conducting metal oxides possessing the brownmillerite crystallographic structure can be used to prepare gas-impermeable ceramic membranes for use in membrane reactors for spontaneously separating oxygen from a gas, e.g., from air, on their reducing surface and mediating transfer of this oxygen as oxygen anions to the oxidation surface of the membrane where they can participate in a selected oxidative chemical process. For example, natural gas (predominantly methane) can be spontaneously converted to synthesis gas, a mixture of carbon monoxide (CO) and hydrogen ($H_2$) which is useful as a feedstock for preparation of liquid fuels.

The reaction to form synthesis gas is a partial oxidation that is written:

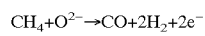

FIG. 1 illustrates schematically how this reaction would occur ideally in a ceramic membrane reactor. The membrane of FIG. 1 illustrated as having a reduction catalyst on the reduction surface and a partial oxidation catalyst on the membrane oxidation surface. FIG. 1 illustrates that molecular oxygen ($O_2$) is reduced at the reducing surface of the membrane to form oxygen anions ($O^{2-}$) which are conducted across the membrane (due to the presence of an oxygen gradient). $O^{2-}$ at the oxidizing surface of the membrane reacts with methane to give the partial oxidation product CO and $H_2$ with $H_2$:CO ratio of 2:1.

A problem that occurs with ceramic membrane reactors is that the membrane material itself can be catalytically active toward oxygen anion changing the nature of the oxygen species that are available for reaction at the membrane surface. For example, the membrane material may catalyze reoxidation of oxygen anions to molecular oxygen. The membrane then serves to deliver molecular oxygen to the oxidation zone of the reactor. The presence of molecular oxygen can significantly affect the selectivity of a given reaction. For example, reaction of methane with molecular oxygen leads to deep oxidation of methane generating $CO_2$:

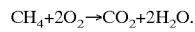

A membrane that exhibits no substantial reactivity toward oxygen anions, yet retains ionic and electronic conductivity, i.e. a membrane that is not inherently catalytically active toward oxygen, would provide for better reaction selectivity in a membrane reactor. In this case, reactivity could be determined by choice of an adherent catalyst layer on the oxidation surface of the membrane. By appropriate choice of the adherent catalyst layer a high degree of selectivity for a desired oxidation reaction should be achievable.

The use of a membrane material which has minimal catalytic activity towards oxygen separates the oxygen transport properties of the membrane from the catalytic activity. This will allow fine tuning of catalytic activity by catalyst layer choice, in particular it will allow control of the surface oxygen species allowing selection among a variety of oxygen species at the membrane surface $O^{2-}$, $O_2^-$ (superoxide), O. (radical), peroxo ($O_2^{2-}$), etc.

SUMMARY OF THE INVENTION

This invention provides a catalytic membrane reactor for partial or full oxidation of reduced species, particularly of hydrocarbons. The reactor comprises a gas-impermeable membrane which exhibits ion conductivity. The membrane is also provided with electronic conduction to maintain membrane charge neutrality. Electronic conduction can be provided by an external circuit or the membrane material can itself be an electronic conductor. The reactor has an oxidation zone and a reduction zone separated by the membrane which itself has an oxidation surface exposed to the oxidation zone and a reduction surface exposed to the reduction zone. The oxidation surface of the membrane is, at least in part, covered with an adherent catalyst layer. The reduction surface of the membrane is optionally provided with an oxygen reduction catalyst. The reactor is also optionally provided with a three-dimensional catalyst in the oxidation zone of the reactor in close contact with the adherent layer on the oxidation surface of the membrane.

Preferred membranes of this invention are single phase mixed ionic and electronic conducting ceramics. In this case no external electric circuit is required to maintain membrane charge neutrality. To facilitate selective oxidation, preferred membranes are those that exhibit minimal catalytic activity for oxidation of oxygen anions, e.g., are minimally active for reoxidation of oxygen anions to molecular oxygen, on transport of oxygen anion through the membrane. These membranes deliver minimal amounts of molecular oxygen to the oxidation surface of the membrane and to the oxidation zone of the reactor and minimize deep oxidation of hydrocarbons (e.g., $CH_4$ to $CO_2$).

Preferred membrane materials of this invention are single-phase brownmillerite materials having the stoichiometric formula:

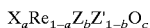    I where A is an alkaline earth metal ion or mixture of alkaline earth metal ions; A' is a metal ion or mixture of metal ions where the metal is selected from the group consisting of metals of the lanthanide series and yttrium; B is a metal ion or mixture of metal ions wherein the metal is selected from the group consisting of 3d transition metals, and the group 13 metals; B' is a metal ion or mixture of metal ions where the metal is selected from the group consisting of the 3d transition metals, the group 13 metals, the lanthanides and yttrium; x and y are, independently of each other, numbers greater than or equal to zero and less than or equal to two and z is a member that renders the compound charge neutral. The value of z generally is greater than zero and less than 1.0, more preferably z is greater than zero and less than or equal to about 0.5, and most preferably z is greater than zero and less than or equal to 0.3. The exact value of z depends upon the valencies and stoichiometries of A, A', B, and B'. Preferably x is greater then zero and less than 1 and y is greater than or equal to 1 but less than 2.

The adherent catalyst layer is preferably a mixed ionic and electronic conducting layer. The catalyst of this layer is preferably chosen to facilitate efficient mediation of $O^{2-}$ from the membrane to the chemical species to be oxidized. Alternatively the catalyst is chosen to control the nature of the oxygen species that will interact with the chemical species to be oxidized. A preferred adherent catalyst for facilitating efficient mediation of $O^{2-}$, and thus preferred for partial oxidation of hydrocarbons, is a mixed ionic and electronic conducting ceramic having the composition:

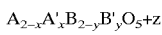

where X is Ca, Sr or Ba, Re is a rare earth or lanthanide metal, including yttrium, Z is Al, Ga, In or combinations thereof and Z' is Cr, Mn, Fe, Co, or combinations thereof with $0 \leq a \leq 1$ and $0 \leq b \leq 1$ and c is a number, dependent upon the oxidation states of the other components, and the values of a and b, that renders the composition charge neutral.

The adherent catalyst layer can be formed by catalyst particles with deposited metal to give a mixed conducting (ion and electronic) cermet catalyst. Preferred deposited metals include Ni, Pt, Pd, Rh, Ir, Ag and combinations thereof. Metal can be deposited from about 1 wt % to about 50 wt % on the supporting catalyst. Ni deposited on a relatively basic mixed conducting support, such as $La_aSr_{1-a}MnO_3$, where $0 \leq a \leq 1$ and particularly where a is $0.7 \leq a \leq 0.9$, is a preferred adherent catalyst for the partial oxidation of methane to synthesis gas.

The adherent catalyst layer can also be a catalyst, such as those listed in Table 1 or 2, which promotes partial oxidation of methane to CO and $H_2$, promotes oxidative coupling of alkanes, particularly methane to olefins, promotes the oxidative dehydrogenation of alkanes, or which promotes oxygenate production including the partial oxidation of alkanes to alcohols, aldehydes or ketones, the partial oxidation of alkenes to epoxides or the partial oxidation of alkane to anhydrides. Membranes of formula I in combination with an appropriately selected adherent catalyst are useful in catalytic reactor membranes for the listed partial oxidation reactions.

The adherent catalyst layer also provides protection for the membrane material to prevent decomposition under operating conditions.

The optional three-dimensional catalyst can be a packed- or fluidized-bed catalysts, and preferably is a packed-bed catalyst, in close contact with the adherent catalyst layer. This catalyst is selected to promote a desired oxidation reaction. The three-dimensional catalyst can, for example, comprise a metallic catalyst deposited on a support. Preferred metals include Ni, Pt, Pd, Rh, Ir, Ag, and combinations thereof. The support can be an inert oxide or a mixed metal oxide. Inert oxides include alumina. A mixed ionic and electronic conducting material can also be used as the support. The three-dimensional catalyst may be, but need not be, the same material as the adherent catalyst layer.

This invention provides reactors as described above, membranes with adherent catalyst layers and methods of oxidizing reduced species, particularly hydrocarbons, using these reactors and membranes.

DETAILED DESCRIPTION OF THE INVENTION

Figure 1:
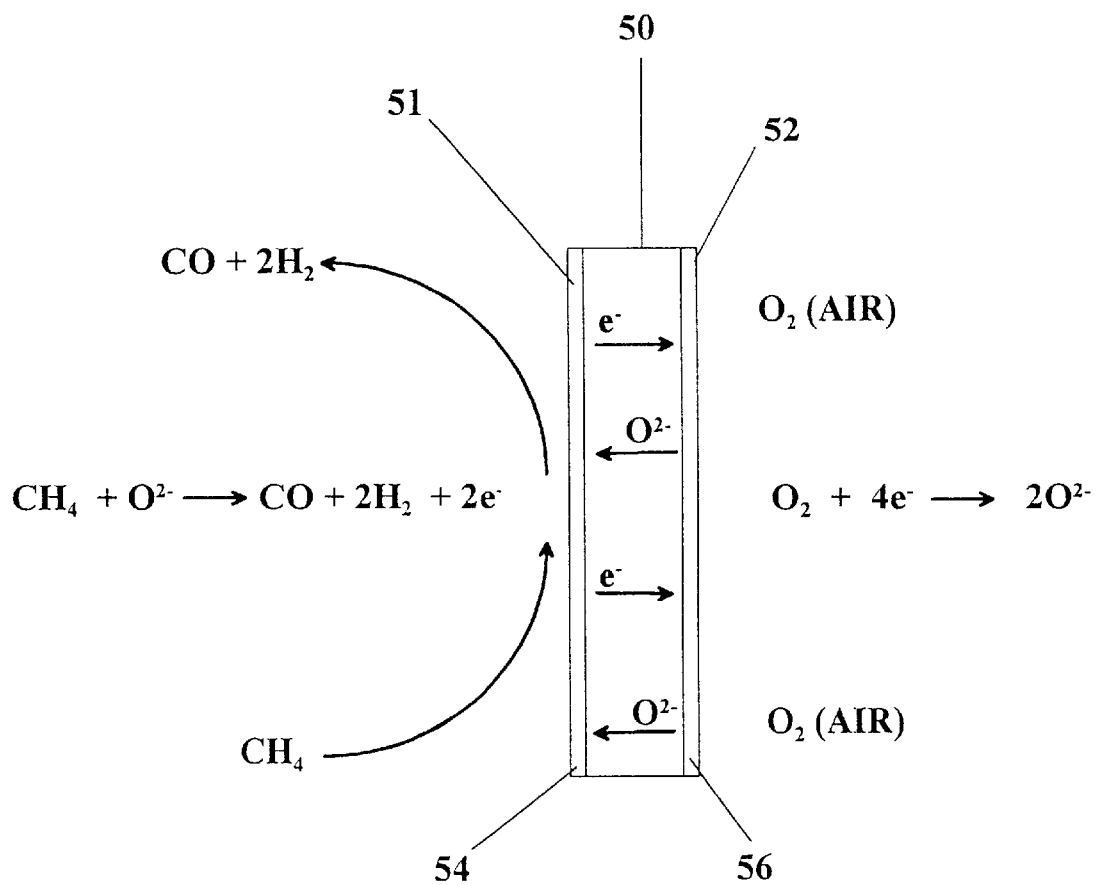
FIG. 1 is a schematic drawing illustrating the catalytic membrane reaction leading to formation of synthesis gas from methane.

This invention relates to improved catalytic membrane reactors for the selective partial or full oxidation of various reduced chemical species. The reactor, in general, mediates the reaction of a reactant gas stream containing a reduced species, such as a hydrocarbon or partially oxidized hydrocarbon, with an oxygen-containing gas reagent stream to generate reaction products that are oxidized relative to the species initially in the reactant stream. The oxidized products are generated in the reactant stream as catalysis proceeds forming a product stream containing species that are oxidized relative to the reactant species.

The term oxygen-containing gas is used broadly herein to include gases and mixtures of gases in which at least one of the component gases is oxygen or an oxide. The oxygen or oxide component of the gas is capable of being reduced at the reduction surface of the membrane of this invention. The term includes carbon, nitrogen, and sulfur oxides ($CO_x$, $NO_x$ and $SO_x$) among others, and gas mixtures in which an oxide is a component, e.g., $NO_x$ in an inert gas or in another gas not reactive with the membrane. The term also includes mixtures of molecular oxygen ($O_2$) in other gases, e.g., $O_2$ in air., $O_2$ in an inert gas, such as He, Ar, etc. In the reactors of this invention, the oxygen-containing gas is passed in contact with the reduction surface of the membrane and the oxygen-containing component of the gas is at least partially reduced at the reduction surface, e.g., $NO_x$ to $N_2$. The gas passing out of the reduction zone of the reactor may contain residual oxygen or oxygen-containing component.

The term "reactant gas" is used broadly herein to refer to gases or mixtures of gases containing at least one component that is capable of being oxidized at the oxidation surface of a reactor of this invention. Reactant gas components include reduced species, including, but are not limited to, methane, natural gas (whose major component is methane), gaseous hydrocarbons including light hydrocarbons (as this term is defined in the chemical arts, including alkanes, alkenes, and alkynes and partially oxidized hydrocarbons, such as alcohols. Reactant gases include mixtures of reduced species with inert gases, or mixtures of such components with oxygen-containing species, such as CO, $CO_2$ or $H_2O$. The term "oxygen-consuming gas" may also be used herein to describe a reactant gas that reacts with oxygen anions generated at the oxidizing surface of the membrane.

The terms "oxygen-containing gas", "reactant gas," "oxygen-consuming gas," any other gas mixture discussed herein includes materials that are not gases at temperatures below the temperature ranges of the pertinent process of the present invention, and may include materials which are liquid or solid at room temperature. An example of an oxygen-containing gas which is liquid at room temperature is steam.

The term "gas-impermeable" as applied to membranes of this invention means that the membrane is substantially impervious to the passage of oxygen-containing or reactant gases in the reactor. Minor amounts of transport of gases across the membrane may occur without detriment to the efficiency of the reactor. It may be that membranes of this invention will allow passage of low molecular weight gases such as $H_2$. The membranes of this invention conduct oxygen anions and in this sense are permeable to oxygen. The membranes are impermeable to oxygen gas itself.

Figure 2:
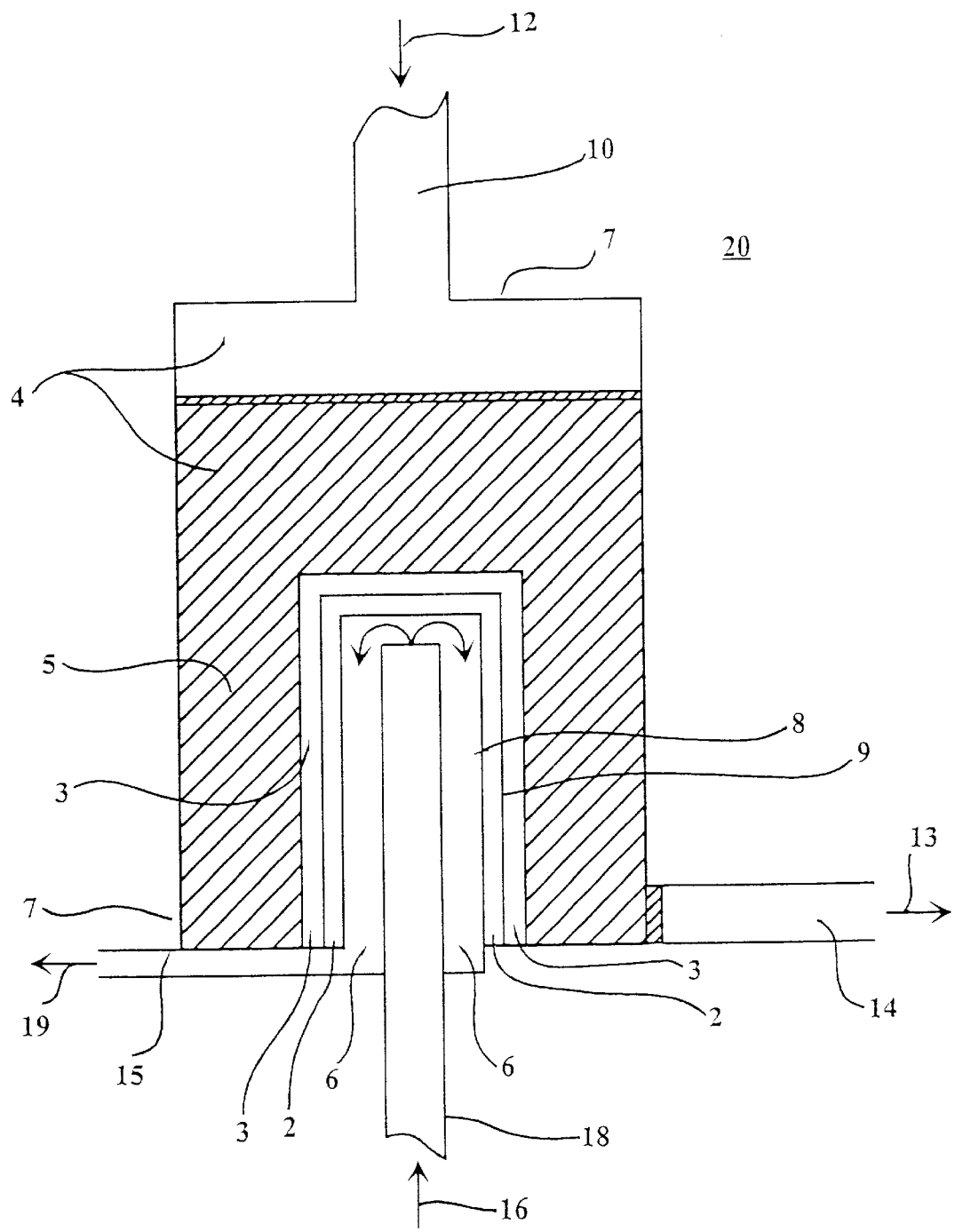
FIG. 2 is a drawing of a single cell membrane reactor (not drawn to scale) with packed-bed catalyst in the oxidation zone.
Figure 3A:
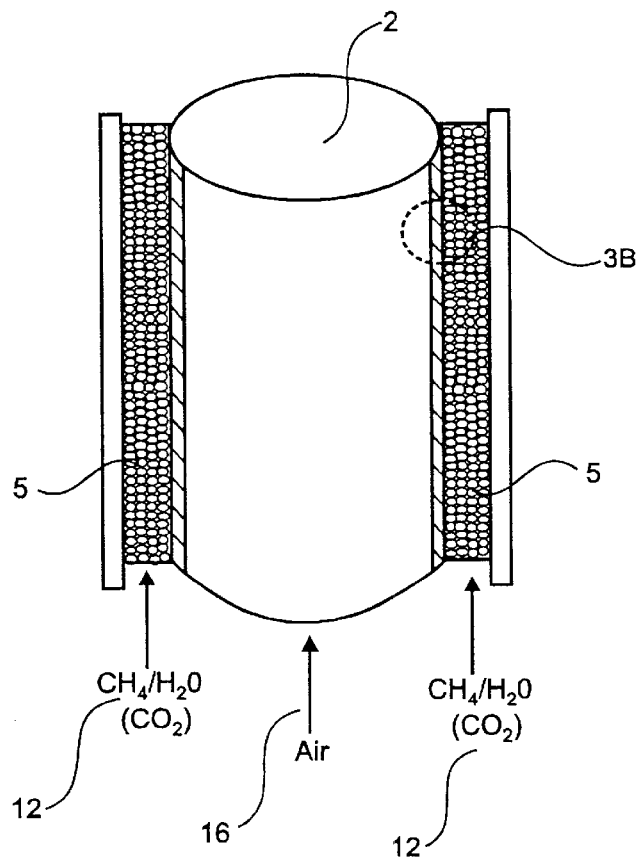
FIGS. 3A and 3B are more detailed illustrations of the membrane, adherent catalyst and packed-bed reactor of FIG. 2 and 4.
Figure 3B:
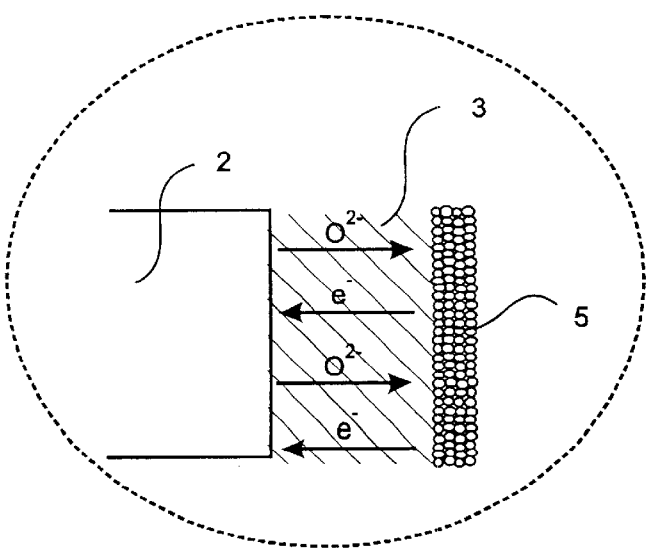

Referring now to the drawings, where like numbers represent like features, a single-cell catalytic membrane reactor of the present invention may be schematically represented (not drawn to scale), in cross-sectional view, as shown in FIG. 2 and in more detail in FIG. 3A and B.

Reactor cell (20) comprises a ceramic membrane (2) an adherent catalyst layer (3) and a three-dimensional catalyst (5) enclosed with reactor shell (7). The reactor cell comprises an oxidation zone (4) separated from a reduction zone (6) separated by the membrane which is gas-impermeable. The membrane is illustrated as a cylindrical closed-end tube, but any shape capable of creating two separate zones would be sufficient. The outer perimeter of the reduction zone is defined by membrane (2) and the outer perimeter of the oxidation zone is defined by the reactor shell (7). The membrane has a reduction surface (8) facing the reduction zone (6), i.e., the inner surface of the tube, and an oxidation surface (9), i.e., the outer surface of the tube facing the oxidation zone (4). Feed tube (10) delivers a reactant gas (12), such as methane, into the oxidation zone (4). Reacted gases (13), including products of oxidation, exit the oxidation zone (4) via at least one exit port (14). An oxygen-containing gas (16), such as air, is delivered into the reduction zone (6) via entrance port (18). Reacted gases (19), such as oxygen-depleted air, exit the reduction zone (6) via at least one exit port (15).

The oxidation surface of membrane (2) is, at least in part, coated with an adherent catalyst layer (3). The catalyst in this layer is chosen as discussed below to promote the desired oxidation reaction. The reactor cell further comprises a three-dimensional catalyst (5) in oxidation zone (4) in contact with adherent catalyst layer (3). The membrane can optional have a layer of an oxygen reduction catalyst (not shown) on its reduction surface to promote reduction of $O_2$ to oxygen anions.

Oxygen anions ($O^{2-}$) originate from initial reduction of molecular $O_2$ (or other oxygen-containing species) on the reducing surface of the membrane and migrate through the membrane to the membrane oxidation surface. The adherent catalyst layer facilitates mediation of oxygen anions ($O^{2-}$) species from the membrane oxidation surface to the chemical species in the reactant gas undergoing oxidation reactions. The adherent layer can also be selected to control the nature of the oxygen species made available for reaction with the reactant gas. For example, anionic oxygen species can be converted (at least in part) by the adherent catalyst layer into superoxide, oxo, oxygen radical, peroxo or other reactive oxygen species and made available at the catalyst layer for oxidation of reduced species in the reactant gas. The nature of the oxidation reaction that occurs is strongly dependent upon the nature of the reactive oxygen species present at the catalyst layer.

In cases where the oxygen-containing species in the oxygen-containing gas is not $O_2$ (e.g., $NO_2$) the reduction surface of the membrane can be coated with a catalyst that promotes the reduction of the oxygen-containing species as described in U.S. Ser. No. 08/639,781.

The thickness of the membrane and the adherent catalyst are in general optimized for desired reactor performance. The membrane must be sufficiently thick to provide structural stability and preferably is suitable for long term operation under reaction conditions. The adherent catalyst can for example be up to several hundreds of microns thick.

The three dimensional catalyst (5) is in close contact with the adherent catalyst layer. By being in close contact with the adherent layer, the oxygen species in that layer can migrate to the packed-bed or other three-dimensional catalyst yielding a higher surface area for oxidation. In general, the packed-bed is provided as a layer of catalyst particles surrounding the oxidations surface of the membrane. This element of the reactor cell serves to increase production rates and throughput conversions. FIG. 3A and B provide a more detailed illustration of the membrane, adherent catalyst layer and three dimensional catalyst which is exemplified as a packed-bed catalyst.

In the illustrated embodiment of the reactor cell in FIG. 2, the outer surface of the membrane tube is the oxidation surface. Alternative embodiments of the reactor cell include those in which the inner surface of the membrane tube is the oxidation surface and the three dimensional catalyst is positioned within the tube.

The reactor of FIG. 2 is a single cell reactor with a closed-end tubular membrane. The reactor can be implemented as a multiple membrane catalytic reactor as illustrated in FIG. 4.

Figure 4:
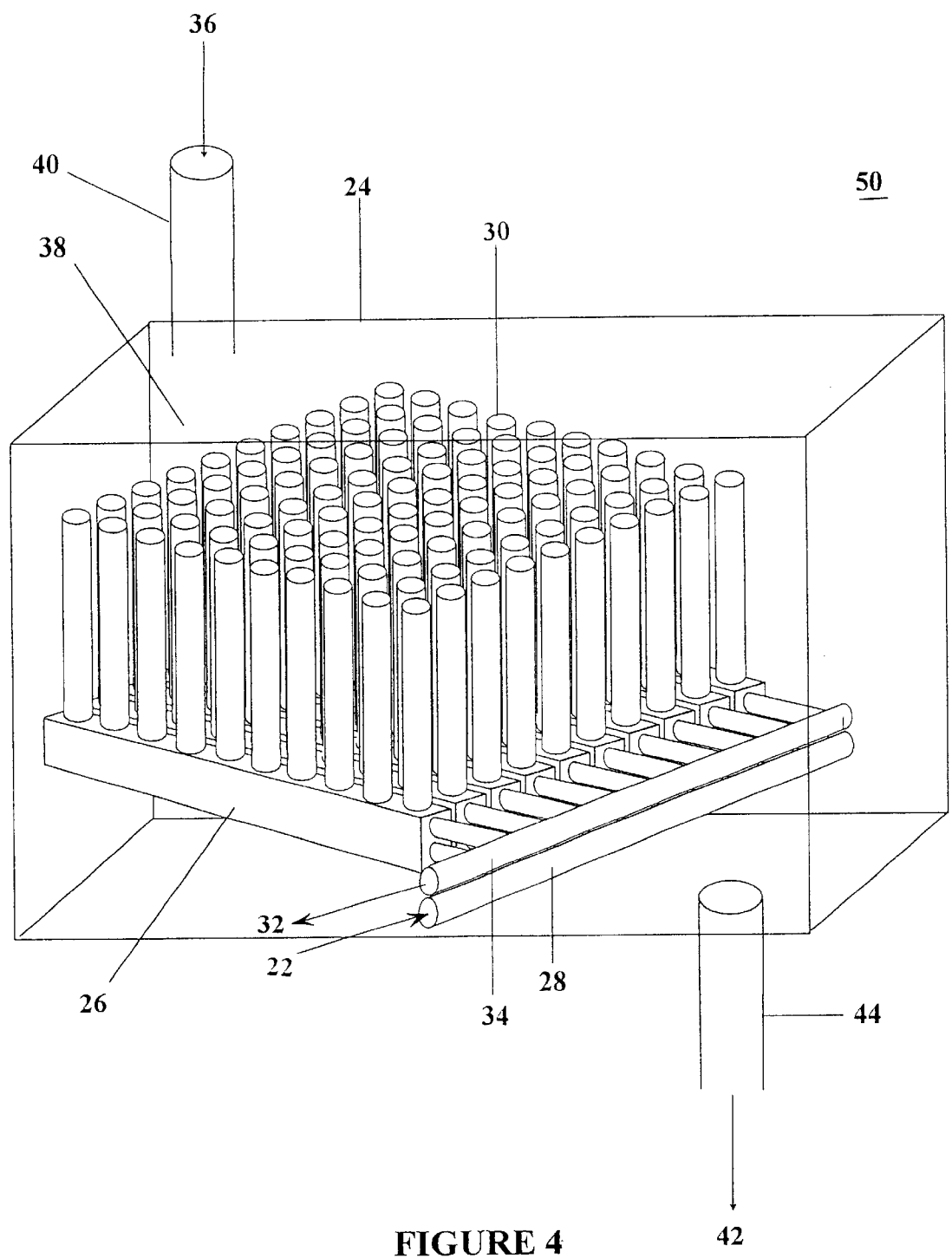
FIG. 4 is an illustrative example of a multiple cell catalytic membrane reactor combining a plurality of reactor membranes of FIG. 2.

The reactor (50) of FIG. 4. comprises a plurality of reactor cells (30) of the type described above and depicted in FIG. 2. The cells (30) which comprise closed-end membrane tubes, like those of FIG. 2 are enclosed in a reactor shell (24), and are linked together by manifold (26). An inlet feed tube (28) delivers oxygen-containing gas (22) to reactor cells (30), and oxygen-depleted gas (32) exits the cells via the manifold (26) through exit tube (34). A reactant gas (36) is delivered to the oxidation zone (38) via reactor shell inlet port (40). Reacted gas containing oxidized products (42) exits the reduction zone (38) via outlet port (44). A three-dimensional catalyst, either a packed-bed, fluidized-bed or related catalyst (not illustrated) is provided in the oxidation zone of this reactor surrounding and in contact with the oxidation surfaces of each of the membranes. The catalyst may be contained within a structure in the reactor oxidation zone surrounding the membrane cells. The three-dimensional catalyst is positioned within the reactor in close contact with the oxidation surfaces of the membranes and the reactant gas, which typically will flow through the three-dimensional catalyst bed.

Preferred membrane materials of this invention are mixed metal oxides having a brownmillerite structure with the formula:

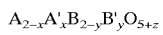  I where A, A', B, B', x, y and z are as defined above.

A brownmillerite is one of a class of minerals, including mixed metal oxides, having a structure like that of the mineral brownmillerite, $Ca_2AlFeO_5$. The general formula of a brownmillerite is $A_2B_2O_5$, where the sum of the valences of the A and B atoms is 5. The brownmillerite structure is characterized in having sheets of perovskite-like corner sharing octahedra perpendicular to the crystallographic b axis, separated by layers of single chains of tetrahedra containing ordered vacancies that are parallel to the c axis. Brownmillerite is, thus, a defect perovskite with the oxygen defects in a particular order. Further, in a substituted brownmillerite $AA'BB'O_{5+z}$, where the ratio of B:B' is 1, and where B is a group 13 metal and B' is a 3d transition metal, all the B' ions will substantially occupy octahedral positions and all the B ions will substantially occupy tetrahedral positions in the lattice.

A compound of brownmillerite structure is distinct from a perovskite. The two structures can be distinguished by X-ray diffraction (XRD). See: Y. Teraoka, H.-M. Zhang, S. Furukawa and N. Yamazoe (1985) *Chemistry Lett*. supra. XRD patterns of membrane materials of this invention can be fit to a Pcmn cell as expected for the brownmillerite structure. See, P. K. Gallagher, J. B. MacChesney and D. N. E. Buchanan (1964) *J. Chem. Phys*. 41:2429; C. Greases, A. J. Jacobson, B. C. Tofield and B. E. P. Fender (1975) *Acta Cryst*. B31:641. Table 1 provides lattice parameters for a number of brownmillerite membrane materials of this invention.

A perovskite is one of a class of materials having a structure based on that of the mineral perovskite, $CaTiO_3$. An ideal perovskite structure has a cubic lattice in which a unit cell contains metal ions at each of the corners and in the middle of the cell and oxygen ions at the midpoints of the edges of the cell. The general formula of a perovskite is $ABO_3$ where A and B are metal ions, the sum of the valences of which are 6. Cable et al. EP 90305684.4 and U.S. Pat. No. 5,306,411 further describe that the radii of the A and B metal ions of a perovskite must conform to the relationship:

$$r_A + r_O = t\sqrt{2}(r_B + r_O)$$

where $r_A$, $r_B$ and $r_O$ are the radii of the A, B and O ions, respectively, and t is a tolerance factor which lies within the approximate range 0.7–1.0.

In a single-phase material, the atoms of the various components of the material are intermingled in the same solid phase. The presence of a single-phase can be assessed by XRD or similar known techniques of structural determination. For example, a single-phase brownmillerite compound is distinguished in that all of the peaks in the XRD can be accounted for by the brownmillerite structure.

More specifically, the membrane materials of this invention are brownmillerite compounds of formula I where the B metal is selected from the group consisting of group 13 metals and mixtures thereof and the B' metal is selected from the group of 3d transition metals or mixtures thereof. Preferred group 13 metals are Al, Ga, and In, and mixtures thereof, with mixtures of Al and Ga being presently more preferred. Transition metal ions more useful for materials of this invention are Co, Ti, V, Cr, Mn, Ni and Fe. Preferred transition metal ions are Cr, Mn, Ni and Fe, with Cr, Mn, and Fe being more preferred and Fe being presently most preferred. Preferred A' metal ions are La and Y, with La being presently more preferred. Preferred A metal ions are Sr and Ba with Sr being presently more preferred. In formula I most generally $0 \leq x \leq 2$ and $0 \leq y \leq 2$ and compounds of that formula where $0.2 \leq x \leq 1.0$ and $1.0 \leq y < 2.0$ are more preferred.

Membrane materials of this invention include brownmillerite compounds of formula II.

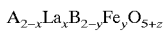  II where A is an alkaline earth metal ion or mixture of alkaline earth metal ions with A that is Sr and Ba being preferred, B is a metal ion or mixture of metal ions where the metal is selected from the group consisting of the 3d transition metals, or the group 13 metals, with B that is a group 13 metal being preferred and B that is a mixture of Al and Ga being more preferred; x and y, independently of one another, are numbers greater than zero and less than 2, with x greater than zero and less than or equal to about 1.0 more preferred and y greater than or equal to 1, but less than 2 more preferred; z is a number that renders the compound neutral, but is typically x/2.

In particular, membrane materials of this invention include brownmillerite materials of formula:

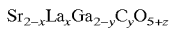  III where C is a 3d transition metal ion and preferably a 3d transition metal ion selected from the group consisting of Fe, Cr or Mn. Brownmillerites of formula IV being more preferred:

$$Sr_{2-x}La_xGa_{2-y}Fe_yO_5+z \qquad \text{IV}$$

where x and y are numbers greater than zero but less than two.

Preferably, x is greater than zero and less than about 1 and y is greater than or equal to 1, but less than 2. More preferred compounds of formulas III and IV have $0.2 \leq x \leq 1.0$ and $1.0 \leq y \leq 2.0$.

Catalytic membranes of this invention facilitate reduction of an oxygen-containing gas and transport of oxygen anions across the membrane for interaction with the adherent catalyst, packed-bed catalyst and reactant gas to oxidize a reduced component of the reactant gas. Catalytic membranes are shaped to have two surfaces: a reduction surface and an oxidation surface. The membrane is fabricated sufficiently thick to render it substantially gas-impermeable and mechanically stable to withstand the stresses associated with reactor operation, yet not so thick as to substantially limit the oxygen ion permeation rate through the membrane. Membranes can be fabricated in a variety of shapes appropriate for a particular reactor design, including disks, tubes, closed-end tubes or as reactor cores for cross-flow reactors.

The specific reaction for the production of synthesis gas from methane is:

$$CH_4 + \tfrac{1}{2}O_2 \rightarrow CO + 2H_2$$

which is believed mediated by $O^{2-}$ as illustrated in FIG. 1. Other oxidation reactions that can be accomplished using membrane reactors of this invention include: oxidative coupling of alkanes, specifically the oxidative coupling of methane to form ethylene; oxidative dehydrogenation of alkanes, specifically the conversion of alkanes to the corresponding olefins (e.g., ethane to ethylene); various partial oxidation reactions leading to value-added products, specifically the oxidation of alkanes to alcohols, aldehydes or ketones or the oxidation of alkanes to anhydrides.

The adherent catalyst layer is selected to facilitate $O^{2-}$ transport to the reduced species in the reactant gas. Alternatively, the adherent catalyst is selected to promote formation of a given reactive oxygen species for reaction with the reduced species in the reactant gas. Tables 1 and 2 provide a listing of suitable known catalysts with citations to the literature for various hydrocarbon oxidation reactions. The references cited in these two Tables are incorporated by reference in their entirety herein for details of catalyst composition, structure, preparation and reactivity.

The nature of the surface oxygen species that interact with the reactant gas will depend strongly on the adherent catalyst. In turn, the type of oxidation reaction that occurs (or dominates) depends upon the nature of the oxygen species that interact with the reactant gas.

The formation of carbon oxides, $CO_2$ in particular, is favored by the presence of species which promote the formation of metal oxo (M=O) species, either by direct conversion of oxygen ions to the oxo form or by rupture of peroxo (O—O) bonds. Compositions containing first row transition metal ions, such as $Co^{2+}$, $Ni^{2+}$, or $Fe^{2+}$ in a weakly basic matrix are expected to promote the formation of monoatomic surface oxygen species and facilitate oxygen transfer to hydrocarbons, for example partial oxidation of methane to CO. Dimeric oxygen species such as the peroxo (M—O—O—M) or superoxide ($O_2^-$) are effective in catalyzing hydrogen abstraction. Formation of dimeric surface species is favored by the presence of relatively non-reducible ions of S, P, and other types of metals (e.g., $Ce^{4+}$, $Pb^{4+}$, $Bi^{3+}$) in a strongly basic matrix (i.e., containing high concentrations of $Sr^{2+}$ or $Ba^{2+}$, for example). This type of catalyst will promote hydrocarbon coupling reactions.

As indicated above, preferred adherent catalyst of this invention can be selected from mixed ionic and electronic conducting ceramics of the formula:

$$X_aRe_{1-a}Z_bZ'_{1-b}O_c$$

where A is Ca, Sr or Ba, Re is a rare earth or lanthanide metal, including yttrium, Z is Al, Ga or In and Z' is Cr, Mn, Fe or Co with a and b numbers such that $0 \leq a \leq 1$ and $o \leq b \leq 1$ and c is a number, dependent upon the oxidation states of the other components, and the values of a and b, that renders the composition charge neutral.

Cermet (a composite between a ceramic and a metal) catalysts of formula:

$$M/X_aRe_{1-a}Z_bZ'_{1-b}O_c$$

where X, Re, Z and Z', a, b and c are as defined immediately above and M is a metal chosen to promote the desired oxidation reaction are also preferred for use as adherent catalysts. Metals for cermet catalysts are preferably selected from Ni, Pt, Pd, Rh, Ir or Ag. The weight percent of metal to mixed conducting catalyst can vary from 1 to about 50%. Preferred content of metal to mixed conducting catalyst is from about 5 wt % to about 20 wt %. The oxidation products obtained will depend upon the support and the metal chosen. Silver, for example, favors oxygen evolution. However, when silver is incorporated onto a very basic support (i.e., one containing a high concentration of Sr or Ba), the formation of surface superoxide species and hydrogen abstraction processes are favored. Ni favors partial oxidation of hydrocarbons, as illustrated in the examples herein, when incorporated onto a moderately basic support, such as $La_{0.8}Sr_{0.2}MnO_3$.

The platinum group of metals (Pt, Pd, Rh, or Ir) on oxide supports will promote different reactions dependent upon choice of support and process variables such as residence time of reactant gas in the reactor. Short residence times favor dehydrogenation products when the metal is supported on a moderately basic to neutral support. Longer residence times with platinum group metals on basic supports tend to favor deep oxidation.

In order to maintain the mechanical integrity of the membrane/adherent catalyst combination, it is preferred to select lattice substituents that impart refractory properties such that a stable solid state interface is formed between the mixed conducting adherent catalyst and the mixed conducting membrane. Using substituents that are similar in both the adherent catalyst layer and the membrane will prevent detrimental solid-state reaction or diffusion between the catalyst layer and the membrane.

The membrane is optionally provided with an oxygen reduction catalyst such as $La_aSr_{1-a}Co\ O_{3-x}$ where $a \leq 0 \leq 1$ and x is a number such that the compound is charge neutral, a is preferably 0.5 or more, and more preferably, a is 0.7 to 0.9; Ag, Pt or Pd metals (e.g., as metal deposited on the membrane); or catalysts of the formula: $ACo_{1-x}M_xO_{3-\delta}$, where A is Ca, Sr, Ba or combinations thereof, x is a number less than 1 and δ is a number that renders the catalyst charge neutral. M is a metal ion with empty metal $e_g$ orbitals and filled metal $t_{2g}$, orbitals, with preferred first row transition metal ions being $Fe^{2+}$, $Co^{3+}$ and $Ni^{2+}$. Preferred membranes are provided with an oxygen reduction catalyst.

Catalyst layers or coatings can be introduced onto membrane surfaces by a variety of methods. For example, a slurry of the catalyst powder in an organic solvent can be prepared and coated on to the membrane surface. The thickness of the layer or coating can be adjusted by varying the amount of slurry coated on the membrane or by adjusting the amount of catalyst in the slurry. The coated membrane is annealed at an appropriately high temperature to remove residual solvent.

Preferred reactors of this invention are provided with a three-dimensional catalyst in the oxidation zone in contact with the adherent catalyst layer. The three-dimensional catalyst can be provided as a packed-bed, moving-bed, entrained-bed or fluidized-bed catalyst. Dependent upon particular catalyst type, catalyst particles can vary in shape (spherical, irregular, cylindrical, etc.) and vary in size from microns to millimeters in size.

A preferred three-dimensional catalyst is a packed-bed catalyst composed of particles of catalyst surrounding the membrane at the oxidation surface. The packed-bed component of the reactor can serve to significantly increase production rates and throughput conversion in a given membrane reaction. By being in close contact with the adherent layer, the oxygen species at the adherent layer can migrate to this packed-bed yielding a higher surface area for reaction.

The three-dimensional catalyst is selected, as is the adherent layer, to promote the desired oxidation reaction. The catalyst can be a metal on inert oxide catalyst, such as Ni on $Al_2O_3$ or other inert support. Alternatively, the catalyst can be a metal supported on a mixed ionic and electronic conducting material, such as Ni on $La_{0.8}Sr_{0.2}MnO_3$. The metal can be present in the catalyst from about 1 wt % to about 50 wt %. The catalyst in the packed-bed can comprise the same (or different) catalytic material as the adherent catalyst layer and can be chosen dependent upon application and reaction conditions from the catalysts listed in Tables 1 and 2.

Membranes with adherent catalyst layer and optionally with oxygen reduction catalyst layer can be characterized by several measurable properties, including total conductivity, anion conductivity and oxygen permeation rates as well as by their performance in a catalytic membrane reactor for promoting a given reaction. Methods for measuring conductivity and oxygen permeation rates are known in the art and exemplary methods are provided in U.S. Ser. No. 08/639, 781, filed Apr. 29, 1996. For example, a 0.97 mm thick tube of $Sr_{1.7}La_{0.3}Ga_{0.6}Fe_{1.4}O_{5.15}$ coated on both surfaces with $La_{0.8}Sr_{0.2}Co\ O_{3-x}$ exhibited an oxygen permeation rate of 0.21 ml/min. $cm^2$ when measured at 900° C. in a reactor with the reduction zone exposed to air and the oxidation zone exposed to He.

The catalytic reactor membranes specifically exemplified in the following examples are run at 900° C. for production of synthesis gas from methane. Dependent upon the type of reaction catalyzed membrane reactors of this invention can be run over a relatively wide range of temperatures from about 500° C. to about 1100° C. The specific temperature and flows of reactant gas and oxygen-containing gas are optimized for a given reaction and membrane material/catalyst. The temperature must be sufficiently high to facilitate useful oxygen anion flux through the membrane without significant product decomposition and without significant damage to the membrane and catalyst materials.

The membranes, adherent catalyst, optional oxygen reduction catalyst and optional three-dimensional catalyst can be readily adapted to a variety of membrane reactor designs following the guidance provided herein.

The following examples are illustrative of the invention and are in no way intended to be limiting.

EXAMPLES

Example 1

Synthesis Gas Production in a Reactor with and without an Adherent Catalyst Layer.

Closed-one-end tubular membranes were fabricated from a single-phase brownmillerite material having the formula: $Sr_{1.7}La_{0.3}Ga_{0.6}Fe_{1.4}O_{5.15}$ Powders of this composition were prepared using standard solid state synthetic techniques, particularly as described in U.S. patent applications Ser. No. 08/163,620 (filed Dec. 8, 1993) and Ser. No. 08/639,781, filed Apr. 29, 1996. Single-phase powders were pressed into a tubular shape by isostatic pressing and subsequently sintered yielding dense and strong tubular membranes. Care must be taken to assure, by repeated grinding and sintering steps, if needed, that the material is a single phase prior to forming tubes by isostatic pressing.

The insides of the tubular membranes were coated with $La_{0.8}Sr_{0.2}CoO_3$ serving as an oxidation reduction catalyst.

The outer surface of one tubular membrane was coated with Ni(20 wt %) on $La_{0.8}Sr_{0.2}MnO_3$. This catalyst served as an adherent catalyst layer on the oxidation surface of the membrane.

Tubular membranes with and without the adherent catalyst layer were compared in a synthesis gas reactor, like that of FIG. 1. In both cases, the reactor was provided with a packed-bed of Ni(5 wt %) on $Al_2O_3$ in the oxidation zone of the reactor. In each case, air was used as the oxygen-containing gas passed through the inside of the tubular membranes and a mixture of 80% (volume) methane in helium was used as the reactant gas passed outside the tubular membrane through the packed-bed catalyst. Both reactors were operated at 900° C. Table 3 summarizes the results of this comparison.

TABLE 3

Comparison of Results Obtained for $Sr_{1.7}La_{0.3}Ga_{0.6}Fe_{1.4}O_{5.15}$ Closed-one-end Membrane Tube Reactors at 900° C. with and without an Adherent Catalyst Layer.

| Reactor Configuration | Production Rate (ml/min-cm²) | $H_2$:CO | CO Selectivity (%) | Throughput Conversion (%) |
| --- | --- | --- | --- | --- |
| No Adherent Catalyst Layer | 0.16 | 2.4 | 86 | >1 |
| Ni(20% wt) on $La_{0.8}Sr_{0.2}MnO_3$ Adherent Catalyst Layer | 44.9 | 1.8 | 97 | 77 |

The membrane reactor in which there was no adherent catalyst layer exhibits essentially no activity towards partial or deep oxidation of methane, even in the presence of a packed-bed catalyst. The membrane reactor in which there is an adherent catalyst layer on the oxidation surface of the membrane is extremely active towards the partial oxidation reaction with high production rates of synthesis gas and high throughput conversions without sacrificing selectivity as evidenced by the high CO selectivity and $H_2$:CO ratio.

Example 2

Synthesis Gas Production in a Reactor with and without a Packed-Bed Catalyst

Closed-one-end tubular membranes were fabricated from a single-phase brownmillerite material having the formula: $Sr_{1.7}La_{0.3}Ga_{0.6}Fe_{1.4}O_{5.15}$ as in Example 1.

The insides of the tubular membranes were coated with $La_{0.8}Sr_{0.2}CoO_3$ serving as an oxidation reduction catalyst. The outer surfaces of the tubular membranes were coated with an adherent catalyst: of Ni(20 wt %) on $La_{0.8}Sr_{0.2}MnO_3$.

Tubular membranes were compared in a synthesis gas reactor, like that of FIG. 1. One reactor was provided with a packed-bed of $Al_2O_3$ pellets which had been coated with powder of Ni(10 wt %) on $La_{0.8}Sr_{0.2}MnO_3$ in the oxidation zone of the reactor. In each case, air was used as the oxygen-containing gas passed through the inside of the tubular membranes and a mixture of 80% (volume) methane in helium was used as the reactant gas passed outside the tubular membrane through the packed-bed catalyst. Both reactors were operated at 900° C. Table 4 summarizes the results of this comparison.

TABLE 4

Comparison of Results Obtained for $Sr_{1.7}La_{0.3}Ga_{0.6}Fe_{1.4}O_{5.15}$ Closed-one-end Membrane Tube Reactors at 900° C. with and without a Packed-Bed Catalyst.

| Reactor Configuration | Production Rate (ml/min-cm$^2$) | H$_2$:CO | CO Selectivity (%) | Throughput Conversion (%) |
|---|---|---|---|---|
| No Packed-Bed Catalyst | 2.55 | 2.0 | 50 | 13 |
| Packed-Bed Ni(10% wt)on $La_{0.8}Sr_{0.2}MnO_3$ on $Al_2O_3$ | 11.04 | 1.9 | 97 | 39 |

The membrane reactor having the packed-bed catalyst showed dramatically higher productivities, throughput conversions and CO selectivity without loss of $H_2$ selectivity as evidenced by the high $H_2$:CO ratio.

Example 3

Synthesis Gas Production in a Reactor with different Adherent Layer Catalyst

Closed-one-end tubular membranes were fabricated from a single-phase brownmillerite material having the formula: $Sr_{1.7}La_{0.3}Ga_{0.6}Fe_{1.4}O_{5.15}$ as described in Example 1.

The insides of the tubular membranes were coated with $La_{0.8}Sr_{0.2}CoO_3$ serving as an oxidation reduction catalyst.

The outer surface of one tubular membrane was coated with $La_{0.8}Sr_{0.2}MnO_3$. The outer surface of a second tubular membrane was coated with Ni(20 wt %) on $La_{0.8}Sr_{0.2}MnO_3$. These catalysts served as adherent catalyst layers on the oxidation surface of the two membranes.

Tubular membranes with different adherent catalyst layers were compared in a synthesis gas reactor, like that of FIG. 1. In both cases, the reactor was provided with a packed-bed of Ni(5 wt %) on $Al_2O_3$ in the oxidation zone of the reactor. In each case, air was used as the oxygen-containing gas passed through the inside of the tubular membranes and a mixture of 80% (volume) methane in helium was used as the reactant gas passed outside the tubular membrane through the packed-bed catalyst. Both reactors were operated at 900° C. Table 5 summarizes the results of this comparison.

TABLE 5

Comparison of Results Obtained for $Sr_{1.7}La_{0.3}Ga_{0.6}Fe_{1.4}O_{5.15}$ Closed-one-end Membrane Tube Reactors at 900° C. with Different Adherent Catalyst Layers.

| Reactor Configuration | Production Rate (ml/min-cm$^2$) | H$_2$:CO | CO Selectivity (%) | Throughput Conversion (%) |
|---|---|---|---|---|
| $La_{0.8}Sr_{0.2}MnO_3$ Adherent Catalyst Layer | 23.0 | 1.8 | 99 | 44 |
| Ni(20% wt) on $La_{0.8}Sr_{0.2}MnO_3$ Adherent Catalyst Layer | 30.4 | 1.8 | 99 | 68 |

Both membrane reactors exhibit high productivities and throughput conversions with high selectivities. The reactor utilizing Ni(20% wt) on $La_{0.8}Sr_{0.2}MnO_3$ as the adherent catalyst layer has approximately 30% higher productivity. This indicates that the adherent catalyst layer not only operates as an oxygen catalyst, but also can be used to promote the desired oxidation reaction.

Example 4

Effectiveness of an Adherent Catalyst Layer for Protection of the Membrane Surface A closed-one-end tubular membrane were fabricated from a single-phase brownmillerite material having the formula: $Sr_{1.7}La_{0.3}Ga_{0.6}Fe_{1.4}O_{5.15}$ as in Example 1. The inside of the tubular membranes were coated with $La_{0.8}Sr_{0.2}CoO_3$ serving as an oxidation reduction catalyst. A portion of the outer surface of the tubular membrane was coated with an adherent catalyst: Ni(40 wt %) on $La_{0.8}Sr_{0.2}MnO_3$. The remaining portion of the membrane surface was left uncoated. No packed-bed catalyst was used in this experiment. A reactor containing the partially coated tubular membrane was run under the same conditions for synthesis gas reaction as in Examples 1–3. The reactor was run for one year after which it was voluntarily terminated. A white coating had formed on the oxidation surface of the membrane that had not been coated with adherent catalyst. The other portion of the membrane surface that had been coated did not show this white coating. Subsequent energy dispersive spectroscopy and X-Ray photoelectron spectroscopic analysis of the white powder identified it as $SrCO_3$. This compound likely forms as a result of the reaction of SrO with $CO_2$. This result indicates that the membrane material is segregating into components. No evidence of this reaction is observed in the region of the reactor that is coated. This suggests that the addition of Mn or other transition metals such as Cr, V or Ti through the adherent layer prevents Sr segregation in the membrane. Alternatively, higher La content or doping with other lanthanide metals into the membrane material can also ameliorate segregation.

Those of ordinary skill in the art will appreciate that the objects and practice of this invention can be accomplished without resort to the specific reactors, membranes, catalysts, reagents and reactants disclosed herein. Further, it will be appreciated that techniques for preparation of membranes, adherent catalysts, and three-dimensional catalysts and reactor designs and operation other than those specifically described herein can be employed without deviating from the spirit and scope of this invention.

TABLE 1

PARTIAL OXIDATION, STEAM REFORMING AND $CO_2$ REFORMING CATALYSTS

| | Ref. No. |
|---|---|
| A) Perovskites and Related Phases | |
| Cobalt containing perovskites $LnCoO_3$ where Ln is a rare earth. | 1 |
| Titanate Perovskites | 2 |
|    Ni on $Ca_{1-x}Sr_xTiO_3$. (Particularly under reducing conditions.) | |
|    Ni on $Ca_{1-x}Sr_xTi_{1-y}Ni_yO_3$. | 3 |
|    $Ca_{1-x}Sr_xTiO_3$ containing Cr, Fe, Co or Ni | 4, 5 |
| 3. Ni based perovskites | 6 |
|    $LaNiO_3$, $La_{0.8}Ca$(or $Sr)_{0.2}NiO_3$, $LaNi_{1-x}Co_xO_3$ These are mixed conductors | 6 |
|    $LaNiO_x$, $LiNiLaO_x$ | 7 |
|    $LaNiO_3$ and $LaNiAl_{11}O_{19}$ | 8 |
|    NiO-LnO 1:1 (Ln = lanthanide) | 9 |
| 4. Miscellaneous Perovskites | 10 |
|    a. $Ba_3NiRuTaO_9$, can be a mixed conductor | |
|    b. La-M-O where M = Co, Cr, Ni, Rh | 11 |
|    c. Ba-Pb, Ba-Bi and Ba-Sn Perovskites | 12 |
| 5. Undefined Perovskites | 13, 14, 15 |
| B) $CeO_2$ and Metal-Supported on $CeO_2$ | |
| Doped cerias are ionic conductors and under reducing conditions can become electronic conductors as well. | |
| 1. $CeO_2$ in a redox cycle | 16 |
| 2. Ru or Ir on samaria-doped ceria | 17 |
| 3. Pt black on $CeO_2$ | 18 |
| 4. Rh on $CeO_2$ | 19 |
| C) Yttria-Stabilized Zirconia Support | |
| YSZ is an oxide ion conductor. Doping may produce electronic conductivity under reducing conditions. | |
| 1. Ru on YSZ | 20 |
| 2. Ni on YSZ | 21 |
| 3. Rh on YSZ | 22, 23 |
| D) Partial Oxidation in a Fuel Cell or Electrochemical Reactor | |
| Although not a membrane, an oxide ion based fuel cell delivers oxygen (or oxide ions) to the partial oxidation surface similar to mixed conducting membranes of this invention, Therefore, the catalysis is applicable. | |
| 1. Pt electrocatalyst | |
|    a. YsZ electrolyte | 24 |
|    b. Undefined electrolyte | 25 |
| 2. Ni electrocatalyst | |
|    a. on doped $LaGaO_3$ electrolyte | 26 |
|    b. on YSZ | 27 |
| 3. Rh electrocatalyst on YSZ electrolyte | 28 |
| 4. Fe on YSZ | 27, 29, 30 |
| 5. Rh on YSZ | 31, 32 |
| 6. Pd on YSZ | 33 |
| 7. Ag on YSZ | 32 |
| 8. $CeO_2$ and $Rh/CeO_2$ on YSZ | 34 |
| 9. $YBa_2Cu_3O_x$ on YSZ. | 35 |
| This is a mixed ionic/electronic conductor but not stable under reducing conditions | |
| E) Metals on Titanium Oxide | |
| If metals form compounds with the titanium oxide, then titanates with mixed ionic and electronic conductivity can develop. | |
| 1. Ni on $TiO_2$ | 36, 37 |
| 2. Ir on $TiO_2$ | 38 |
| 3. Ru on $TiO_2$ | 39 |
| 4. Pd on $TiO_2$ | 40 |
| F) Miscellaneous | |
| 1. Rare Earth Transition Metal Pyrochlores - Pyrochlores are known ionic and electronic conductors | 41 |
| 2. Rh Black - an Rh oxide which can exhibit mixed conductivity | 42 |
| 4. Pt - Pt is a good oxygen catalyst | 43 |
| 5. Mo and W Carbides | 44 |

1 R. Lago, G. Bini, M. A. Pena and J. L. G. Fierro, J. Cat., 167, 198 (1997).
2 T. Hayakawa, H. Harihara, A. G. Andersen, K. Suzuki, H. Yasuda, T. Tsunoda, S. Hamakawa, A. P. E. York, Y. S. Yoon, M. Shimizu and K. Takehira,—Appl. Cat. A—Gen., 149, 391 (1997).
3. K. Takehira, T. Hayakawa, H. Harihara, A. G. Andersen, K. Suzuki and M. Shimmizu, Cat. Today, 24, 237 (1995).
4. T. Hayakawa, A. G. Andersen, M. Shimizu, K. Suzuki and K. Takehira, Cat. Lett., 22, 307 (1993).
5. A. G. Andersen, T. Hayakawa, T. Tsunoda, H. Orita, M. Shimizu and K. Takehira, Cat. Lett., 18, 37 (1993).
6. V. R. Choudhary, B. S. Uphade and A. A. Belhekar, J. Cat., 163, 312 (1996).
7. Q. Miao, G. X. Xiong, X. S. Li, S. S. Sheng and X. X. Guo, Cat. Lett., 41, 165 (1996).
8. A. Slagtern, U. Olsbye, R. Blom, I. M. Dahl and H. Fjellvag, Appl. Cat. A—Gen., 145, 375 (1996).
9. V. R. Choudhary, V. H. Rane and A. M. Rajput, Cat. Lett., 22, 289 (1993).
10. P. D. Battle, J. B. Claridge, F. A. Copplestone, S. W. Carr and S. C. Tang, Appl. Cat. A—Gen., 118, 217 (1994).
11. A. Slagtern and U. Olsbye, Appl. Cat. A—Gen., 110, 99 (1994).
12. D. Dissanayake, K. C. C. Kharas, J. H. Lunsford and M. P. Rosynek, J. Cat., 139, 652 (1993).
13. L. A. Isupova, V. A. Sadykov, S. F. Tikhov, O. N. Kimkhai, O. N. Kovalenko, G. N. Kustova, I. A. Ovsyannikova, Z. A. Dovbii, G. N. Kryukova, A. Y. Rozovskii, V. F. Tretyakoov and V. V. Lunin, Cat. Today, 27, 249 (1996).
14. T. Shimizu, "Properties and Applications pf Perovskite-Type Oxides" L. G. Tejuca, ed. Marcel Dekker, NY, 289 (1993).
15. T. Shimizu, Cat. Rev.—Sci. Eng., 34, 355 (1992).
16. K. Otsuka, E. Sunada, T. Ushiyama and I. Yamanaka, Stud. Surf. Sci. Cat., 107, 531 (1997).
17. M. J. Saeki, H. Uchida and M. Watanabe, Cat. Lett., 26, 149 (1994).
18. K. Otsuka, T. Ushiyama and I. Yamanaka, Chem. Lett., 1517 (1993).
19. V. A. Tsipouriari, A. M. Efstathiou, Z. L. Zhang and X. E. Verykios, J. Cat., 158, 64 (1996).
20. J. Boucouvalas, A. M. Efstathiou, Z. L. Zhang and X. E. Verykios, Stud. Surf. Sci. Cat., 107, 435 (1997.
21. A. S. Ivanova, I. I. Bobrova, E. M. Moroz, V. A. Sobyanin, and V. Y. Gavrilov, Kin Cat., 38, 98 (1997).
22. A. M. Efstathiou, A. Kladi, V. A. Tsipouriari and X. E. Verykios, J. Cat., 158, 64 (1996).
23. V. A. Tsipouriari, A. M. Efstathiou, Z. L. Zhang and X. E. Verykios, Cat. Today, 21, 579 (1994).
24. V. V. Galvita, V. D. Belyaev and V. A. Sobyanin, Reaction Kin. Cat. Lett., 58, 407 (1996).
25. V. V. Galvita, V. D. Belyaev, V. N. Parmon and V. A. Sobyanin, Cat. Lett., 39, 209 (1996).

26. Y. Hiei, T. Ishihara and Y. Takita, Solid State Ionics, 86–8, 1267 (1996).
27. T. Horita, N. Sakai, T. Kawada, H. Yokokawa and M. Dokiya, J. Electrochem. Soc., 143, 1161 (1996).
28. K. Takehira, T. Hayakawa. S. Hamakawa, T. Tsunoda, K. Sato, J. Nakamura and T. Uchijima, Cat. Today, 29, 397 (1996).
29. H. Alqahtany, D. Eng and M. Stoukides, Energy & Fuels, 7 495 (1993).
30. H. Alqahtany, D. Eng and M. Stoukides, J. Electrochem. Soc., 140, 1677 (1993).
31. K. Sato, J. Nakamura, T. Uchijima, T. Hayakawa, S. Hamakawa, T. Tsunoda and K. Takehira, J. Chem. Soc.—Faraday. Trans., 91, 1655 (1995).
32. T. Hayakawa, K. Sato, T. Tsunoda, S. Hamakawa, K. Suzuki, J. Nakamura, K. Takehira and T. Uchijima, J. Chem. Soc.—Chem. Comm., 1899 (1994).
33. T. Hibino, A. Masegi and H. Iwahara, J. Electrochem. Soc., 142, 3262 (1995).
34. Langmuir, 11, 4832 (1995).
35. T. M. Gur, H. Wise and R. A. Huggins, Cat. Lett., 23 387 (1994).
36. T. Osaki, J. Chem. Soc.—Faraday Trans., 93, 643 (1997).
37. M. C. J. Bradfor and M. A. Vannice, Appl. Cat. A—Gen., 142, 97 (1996).
38. K. Nakagawa, T. Suzuki, T. Kobayashi and M. Haruta, Chem. Lett., 1029 (1996).
39. Y. Boucouvalas, Z. L. Zhang and X. E. Verykios, Cat. Lett., 40, 189 (1996).
40. A. Erdohelyi, J. Cserenyi, E. Papp and F. Solymosi, Appl. Cat. A—Gen., 108, 205 (1994).
41. A. T. Ashcroft, A. K. Cheetham, R. H. Jones, S. Natarajan, J. M. Thomas, D. Waller and S. M. Clark, J. Phys. Chem., 97, 3355 (1993).
42. O. V. Buyevskaya, K. Walter, D. Wolf and M. Baerns, Cat. Lett., 38, 81 (1996).
43. K. H. Hofstad, O. A. Rokstad and A. Holmen, Cat. Lett., 36, 25 (1996).
44. A. P. E. York, J. B. Claridge, A. J. Brungs, S. C. Tsang and M. L. H. Green, Chem. Comm., 39 (1997).

TABLE 2

| CATALYSTS FOR VARIOUS OXIDATION REACTIONS | Ref. No. |
|---|---|
| A) Oxidative Coupling of Methane (OCM) | |
| 1) Alkaline Earth Compounds (Mg, Ca, Sr and Ba Oxides) | |
| Each material can be used on its own, or doped, or with co-catalysts | |
| a) MgO and MgSO4 | 47 |
| b) Lithium aluminate/MgO with or without an MoO$_3$ co-catalyst | 48 |
| c) MgO doped with rare earths Nd$_2$O$_3$ | 49 |
| La$_2$O$_3$ with CaO and BaO | 50 |
| Sm$_2$O$_3$ | 51, 52 |
| La$_2$O$_3$ | 53 |
| d) Alkali metal promoted | 54 |
| Li, Na, K, Rb and Cs promoted, | |
| Li and Li/CeO promoted' | 55, 56 |
| Li and Li/Sn promoted | 57 |
| Li promoted | 58, 59, 60, 61 |
| K/Ni promoted CaO and MgO | 62 |
| Li and transition metals | 63, 64 |
| Li/MgO in membrane reactor | 65 |
| e) Transition Metal Doped Ni | 66 |
| f) Calcined coral sands | 67 |
| g) SrCO$_3$ on aluminosilicate | 68 |
| h) Sr with Li on SiO$_2$ | 69 |
| 2) Rare Earths and Rare Earth Compounds | |
| a) Rare earth oxides | 70, 71, 72 |
| in membrane reactors | 73, 74 |
| b) BaLa$_2$O$_4$ | 75 |
| c) Pr$_2$O$_3$ | 76 |
| d) Sm$_2$O$_3$ on Al$_2$O$_3$ | 77 |
| e) La oxide, sulfate and phosphate | 78 |
| f) with alkaline earths | 79 |
| Li$_2$O, CaO and MgO doped CaO | 80 |
| g) Halides | 81 |
| BaCO$_3$/LaOBr | |
| LaF$_3$/SrO and SrF$_2$/La$_2$O$_3$ | 82 |
| h) Na promoted | 83 |
| i) Sm$_2$Sn$_2$O$_7$ | 84 |
| 3) Molybdate and Tungstate Compounds | |
| a) Alkali promoted MnMoO$_4$ | 85, 86, 87, 88, 89 |
| LiCl and Na$_2$MoO$_4$ | 90 |
| b) WO$_4$ on SiO$_2$ with Na | 91 |
| 4) Zirconia-Based Catalysts | |
| a) Alkali treated | 92, 93 |
| 5) Ag-Based Catalysts | |
| a) with sodium phosphate promoter | 94 |
| b) within electrochemical cell | 95, 96 |
| 6) Lead-Based Catalysts | |
| a) PbTiO3 with or without NaCl | 97 |
| b) PbAl$_2$O$_4$ | 98 |
| c) PbO in Pb or alkali salt melts | 99 |
| d) Pb in hydroxyapatite | 100, 101 |
| e) Pb in membrane reactor | 102, 103 |
| 7) Transition-Metal-Oxide-Based Catalysts | |
| a) Fe$_2$O$_3$ | 104 |
| with B$_2$O$_3$ and NaCl | |
| With LiCl | 105 |
| b) SrCoO$_3$ | 106 |
| c) Pervoskite ion conductors La$_{0.8}$Sr$_{0.2}$CoO$_3$ and SrCO$_{0.8}$Fe$_{0.2}$O$_3$ | 107 |
| Perovskites in membrane reactors | 108 |
| Doped La/Mn perovksites | 109, 110, 111 |
| d) Zn on Al$_2$O$_3$ | 112, 113 |
| 8) Bismuth- and Antimony-Based Catalysts | |
| a) Bi$_2$Sn$_{2-x}$Bi$_x$O$_{7-x/2}$ | 114 |
| b) Y$_2$O$_3$ doped Bi$_2$O$_3$ ion conductor | 115 |
| c) Ba2Sb(La$_{0.5}$Bi$_{0.5}$)O$_6$ and Ba$_4$SbTa$_2$LiO$_{12}$ | 116 |
| B) Oxidative Dehydrogenation of Alkanes Including the conversion of alkanes such as ethane, propane and butane into the corresponding olefins ethylene, propylene and butylene. | |
| 1) Vanadium-Based Catalysts | |
| a) Vanadia with MgO | 117 |
| Mg-vanadate | |
| Mg-vandate phases | 118 |
| V-Mg-O in membrane reactor | 119, 120 |
| V$_2$O$_5$/MgO | 121 |
| Magnesium-vanadium | 122 |
| Vanadium-magnesium oxide | 123 |
| Mg$_3$V$_2$O$_8$ | 124 |
| Vanadium magnesium phases for ethylbenzene | 125 |
| b) Other supports | 126, 127 |
| Vanadium on metal and aluminophosphates | 128, 129 |
| Vanadium-containing zeolites | 130 |
| V$_2$O$_3$ on gamma-Al$_2$O$_3$ | 131, 132 |
| Vandium oxide on BaCO$_3$ | 133 |
| vanadium on Al$_2$O$_{3, \text{ sepiolite, hydrotalcite}}$ | 134 |
| Niobia supported vanadia | 135 |
| V$_2$O$_5$/TiO$_2$ with or without alkali metal additives | 136 |
| Vanadia on Al$_2$O$_3$ with or without K | 137 |
| V$_2$O$_5$/TiO$_2$ | 138 |
| V$_2$O$_5$/TiO$_2$ and (VO)$_2$P$_2$O | 139 |

TABLE 2-continued

CATALYSTS FOR VARIOUS OXIDATION REACTIONS

| | | Ref. No. |
|---|---|---|
| | Vanadium on AlPO$_4$ | 140 |
| c) | Other compounds | 141–142 |
| | Mg$_4$V$_2$Sb$_2$O$_x$ | |
| | Rare earth vandates | 143 |
| | Iron containing bismuth molybdovanadate | 144 |
| | (VO)$_2$P$_2$O$_7$ | 145, 146 |
| | Vanadium containing silicalite | 147 |
| 2) | Molybdenum-Based Catalysts | |
| a) | Compounds | 148 |
| | MgMoO$_4$-MoO$_3$ | 149 |
| | Cs, V, Mn added to H$_3$PMo$_{12}$O$_{40}$ | 150 |
| | Cs$_{2.5}$Cu$_{0.08}$H$_{3.3}$PV$_3$Mo$_9$O$_{40}$ | 151 |
| | Nickel molybdate with or without alkali metal promoters | 152 |
| | Magnesium molybdate | 153 |
| | Metal molybdate | 154 |
| | Cr[PMo$_{12}$O$_{40}$] | 155 |
| b) | Miscellaneous molybdenum-based | 156 |
| 3) | Noble Metal Catalysts | |
| a) | Silver | 157 |
| | supported on Al$_2$O$_3$ in fluidized bed and monolith | |
| b) | Platinum, Rhodium, Palladium | 158 |
| | Pt-Sn and Pt-Cu on ceramic monoliths | |
| | Pt/Rh gauze | 159 |
| | Pt, Pd, Rh on ceramic monolith | 160, 161, 162 |
| | supported on Al$_2$O$_3$ | 163 |
| 4) | Transition Metal Compounds | |
| | MgFe$_2$O$_4$ | 164 |
| | La$_{1-x}$Sr$_x$FeO$_{3-y}$ perovskite and ion conductor | 165 |
| | Cr-Mn composition | 166 |
| | Cu-Th oxide | 167 |
| | Transition metals in zeolite ZSM-5 | 168 |
| | MFI-Ferrisilicate | 169 |
| | Mn and Cr oxides on alumina or silica | 170 |
| | Fe-Cr-bimetallosilicate | 171 |
| | Chromia-alumina in membrane reactor | 172 |
| 5) | Antimony and Bismuth Compounds | |
| | Iron antimony oxide | 173 |
| | Layered bismuth chlorides SrBi$_3$O$_4$Cl$_3$ and Ksr$_2$Bi$_3$O$_4$Cl$_6$ | 174 |
| | Antimony containing Keggin type heteropolyoxomolybdates | 175 |
| 6) | Halide Containing | |
| | Metal oxide/metal fluoride | 176 |
| | BaF$_2$ doped LaOF | 177 |
| | Organochlorine additives on Sm$_2$O$_3$ and MgO | 178 |
| 7) | Boria Containing | |
| | Alumina-boria | 179 |
| | Boria-alumina | 180 |
| | Boria on yttria-stabilized zirconia | 181 |
| 8) | Li/MgO | 182 |
| | In membrane reactor | 183 |
| C) | Oxygenate Production | |
| | Including reactions such as methane to formaldehyde or methanol, ethylene or propylene to the corresponding epoxide or butane to maleic anhydride. | |
| | Ferric molybdate | 184 |
| | MoO$_3$—SiO$_2$ | 185, 186, 187 |
| | Alakli metal cations with MoO$_3$—SiO$_2$ | 188 |
| | V$_2$O$_5$—SiO$_2$ | 189, 190 |

47. S. Sugiyama, S. Miyamoto, T. Hayashi and J. B. Moffat, Bull. Chem. Soc. Jpn, 69, 235 (1996).
48. B. K. Miremadi, K. Colbow and S. R. Morrison, Can. J. Chem., 75, 465 (1997).
49. A. Burrows, C. J. Kiely, G. J. Hutchings, R. W. Joyner and M. Y. Sinev, J. Cat., 167, 77 (1997).
50. V. R. Choudhary and V. H. Rane, J. Chem. Tech. Biotech., 69, 63 (1997).
51. O. V. Buyevskaya, M. Rothaemel, H. W. Zanthoff and M. Baerns, J. Cat., 146, 346 (1994).
52. O. V. Buyevskaya, M. Rothaemel, H. W. Zanthoff and M. Baerns, J. Cat., 150, 71 (1994).
53. R. Q. Long, S. Q. Zhou, Y. P. Huang, W. Z. Weng, H. L. Wan and K. R. Tsai, Appl. Cat. A-Gen., 133, 269 (1995).
54. V. R. Choudhary, V. H. Rane and M. Y. Pandit, J. Chem. Tech. Biotech., 68, 177 (1997).
55. Y. Mortazavi, R. R. Hudgins and P. L. Silveston, Can. J. Chem., 74, 683 (1996).
56. K. K. Tiwari, T. N. Roy, S. Banerjee, S. Ganguly and D. P. Bhattacharyya, J. Chem. Tech. Biotech., 63, 190 (1995).
57. E. P. J. Mallens, E. P. J. Hoebink and G. B. Marin, J. Cat., 160, 222 (1996).
58. J. Galuszka, Cat. Today, 21, 321 (1994).
59. D. J. Wang, M. P. Rosynek and J. H. Lunsford, J. Cat., 151, 155 (1995).
60. M. Taniewski, A. Lachowicz, R. Lachowicz, D. Czechowicz and K. Skutil, Ind. Eng. Chem. Res., 33, 185 (1994).
61. E. Ruckenstein and A. Z. Khan, J. Cat., 141, 628 (1993).
62. A. Toebes, K. M. Dooley abd J. R. H Ross, Cat. Today, 21, 401 (1994).
63. F. P. Larkins and M. R. Nordin, Studies Surf. Sci. Cat., 81, 249 (1994).
64. R. Mariscal, J. Soria, M. A. Pena and J. L. G. Fierro, J. Cat., 147, 535 (1994).
65. J. Coronas, M. Menendez and J. Santamaria, Chem. Eng. Sci., 24A, 4749 (1994).
66. F. Gomezgarcia, J. P. Gomez, J. M. Jimenezmateos, S. Vic, J. L. G. Fierro, M. A. Pena and P. Terreros, Solid State Ionics, 63–5, 325 (1993).
67. N. Yamagata, K. Usami and S. Okazaki, Bull. Chem. Soc. Jpn., 67, 2278 (1994).
68. J. S. Church and N. W. Cant, Studies Surf. Sci. Cat., 81, 199 (1994).
69. R. Voyatzis and J. B. Moffat, Energy & Fuels, 9, 240 (1995).
70. O. V. Buyevskaya, M. Rothaemel, H. W. Zanthoff and M. Baerns, J. Cat., 146, 346 (1994).
71. O. V. Buyevskaya, M. Rothaemel, H. W. Zanthoff and M. Baerns, J. Cat., 150, 71 (1994).
72. S. Lacombe, H. Zanthoff and C. Mirodatos, J. Cat., 155, 106 (1995).
73. A. M. Ramachandra, Y. Lu, Y. H. Ma, W. R. Moser and A. G. Dixon, J. Memb. Sci, 116, 253 (1996).
74. A. L. Tonkovich, R. W. Carr and R. Aris, Science, 262, 221 (1993).
75. N. Yamagata, K. Igarashi, H. Saitoh and S. Okazaki, Bull. Chem. Soc. Jpn., 66, 1799 (1993)
76. Y. Matsumara, S. Sugiyama and J. B. Moffat, ACS Symp. Series, 523, 326 (1993).
77. M. J. Capitan, P. Malet, M. A. Centeno, A. Munozpaez, I. Carrizosa and J. A. Odriozola, J. Phys. Chem., 97, 9233 (1993).
78. S. Sugiyama and J. B. Moffat, Energy & Fuels, 7, 279 (1993).
79. G. Roussy, J. M. Thiebaut, M. Souiri, E. Marchal, A. Kiennemann and G. Maire, Cat. Today, 21, 349 (1994).
80. L. Mleczko, U. Pannek, M. Rothaemel and M. Baems, Can. J. Chem. Eng., 74, 279 (1996).
81. C. T. Au, H. He, S. Y. Lai and C. F. Ng, J. Cat., 163, 399 (1996).
82. R. Q. Long, S. Q. Zhou, Y. P. Huang, W. Z. Weng, H. L. Wan and K. R. Tsai, Appl. Cat. A-Gen., 133, 269 (1995).

83. N. B. Wong, K. C. Tin, Q. N. Zhu, M. Z. Zhang and X. Q. Qiu, J. Chem. Tech. Biotech, 67, 164 (1996).
84. A.C. Roger, C. Petit and A. Kiennemann, J. Cat., 167, 447 (1997).
85. S. A. Driscoll and U. S. Ozkan, Studies Surf. Sci. Cat., 82, 367 (1994).
86. S. A. Driscoll, D. K. Gardner and U. S. Ozkan, Cat. Lett., 25, 191 (1994).
87. S. A. Driscoll, D. K. Gardner and U. S. Ozkan, J. Cat., 147, 379 (1994).
88. S. A. Driscoll and U. S. Ozkan, J. Phys. Chem., 97, 11524 (1993).
89. S. A. Driscoll, L. Zhang and U. S. Ozkan, ACS Symp. Series, 523, 341 (1994).
90. J. Kiwi, K. R. Thampi, N. Mouaddib, M. Graetzel and P. Albers, Cat. Lett., 18, 15 (1993).
91. J. G. Wu and S. B. Li, J. Phys. Chem., 99, 4566 (1995).
92. S. Sugiyama, K. Shimodan, A. Ookubo, N. Shigemoto, H. Hayashi and J. B. Moffat, Bull. Chem. Soc. Jpn., 66, 2391 (1993).
93. A. Z. Khan and E. Ruckenstein, J. Cat., 139, 304 (1993).
94. X. Bao, M. Muhler, R. Schlogl and G. Ertl, Cat. Lett., 32, 185 (1995).
95. P.Tsiakaras and C. G. Vayenas, J. Cat., 144, 333 (1993).
96. Y. Jiang, I. V. Yentekakis and C. G. Vayenas, Science, 264, 1563 (1994).
97. M. Yamamura, N. Tsuzuki, H. Okado, T. Wakatsuki and K. Otsuka, Appl. Cat. A-Gen., 115, 269 (1994).
98. J. S. Chang and S. E. Park, Bull. Kor. Chem. Soc., 16, 1148 (1995).
99. 0. Yamazaki, K. Omata and K. Fujimoto, Stud. Surf. Sci. Cat., 81, 277 (1994).
100. Y. Matsumura, J. B. Moffat, S. Sugiyama, H. Hayashi, N. Shigemoto and K. Saitoh, J. Chem. Soc.—Far. Trans., 90, 2133 (1994).
101. Y. Matsumura and J. B. Moffat, Cat. Lett., 17, 197 (1993).
102. T. Nozaki, S. Hashimoto, K. Omata and K. Fujirnoto, Ind. Eng. Chem. Res., 32, 1174 (1993).
103. T. Nozaki and K. Fujimoto, AIChE J., 40, 870 (1994).
104. X. R. Xia, G. X. Xiong, Q. Miao and X. X. Guo, Cat. Lett., 31, 183 (1995).
105. D. Lazarov, V. Rives, R. Klissurska, I. Mitov and D. Klissurki, Mat. Lett., 27, 129 (1996).
106. K. Omata, O. Yamazaki, K. Tomita and K. Fujimoto, J. Chem. Soc., Chem. Comm., 1647 (1994).
107. Y. S. Lin and Y. Zeng, J. Cat., 164, 220 (1996).
108. J. E. ten Elshof, H. J. M. Bouwmeester and H. Verweij, Appl. Cat. A-Gen., 130, 195 (1995).
109. J. E. France, A. Shamsi and M. Q. Ahsan, Energy & Fuels, 2, 235 (1988).
110. A. Shamsi and K. Zahir, Energy & Fuels, 3, 727 (1989).
111. R. V. Siriwardane and A. Shamsi, Appl. Cat., 60, 119 (1990).
112. S. C. Kim, L. E. Erickson and E. Y. Yu, J. Haz. Mat., 41 327 (1995).
113. S. C. Kim, S. J. Kim and E. Y. Yu, Appl. Cat. A-Gen., 150, 63 (1997).
114. C. A. Mims, A. J. Jacobson, R. B. Hall and J. T. Lewandowski, J. Cat., 153, 197 (1995).
115. Y. Zeng and Y. S. Lin, Ind. Eng. Chem. Res., 36, 277 (1997).
116. P. D. Battle, S. W. Carr, F. A. Copplestone and R. S. Mellen, J. Mat. Chem., 4, 421 (1994).
117. E. Finicchio, G. Ramis, G. Busca, V. Loorezelli and R. J. Willey, Cat. Today, 28, 381 (1996).
118. A. Guerroeroruiz, I. Rodriguezramos, P. Ferreiraaparicio and J. C. Volta, Cat. Lett., 45, 113 (1997).
119. C. Tellez, M. Menendez and J. Santamaria, AIChE J., 43, 777 (1997).
120. D. Creaser and B. Andersson, Appl. Cat. A-Gen., 141, 131 (1996).
121. M. K. Yurdakoc, R. Haffner and D. Honicke, Mat. Chem. Phys., 44, 273 (1996).
122. S. A. Korili, P. Ruiz and B. Delmon, Abs. Papers Am. Chem. Soc., 211, Pt1, 202-COLL (1996).
123. A. Pantazidis and C. Mirodatos, ACS Symp Series, 638, 207 (1996).
124. S. R. G. Carrazan, M. Ruwet, P. Ruiz and B. Delmon, Abs. Papers Am. Chem. Soc., 211, Pt1, 204-COLL (1996).
125. W. S. Chang, Y. Z. Chen and B. L. Yang, Appl. Cat A-Gen., 124, 221 (1995).
126. P. Concepcion, A. Corma, J. M. L. Nieto and J. Perezpariente, Appl. Cat A-Gen., 143, 17 (1996).
127. P. Concepcion, J. M. L. Nieto, A. Mifsud and J. Perezpariente, Appl. Cat A-Gen., 151, 373 (1997)
128. P. Concepcion, J. M. L. Nieto and J. Perezpariente, Stud. Surf. Sci. Cat., 94, 681 (1995).
129. P. Concepcion, A. Galli, J. M. L. Nieto, A Dejoz and M. I. Vazquez, Topics Cat., 3, 451 (1996).
130. G. Centi and F. Trifiro, Appl. Cat A-Gen., 143, 3 (1996).
131. G. Capannelli, E. Carosini, O. Monticelli, F. Cavani and F. Trifiro, Cat. Lett., 39, 241 (1996).
132. J. G. Eon, R. Olier and J. C. Volta, J. Cat., 145, 318 (1994).
133. Z. Y. Dang, J. F. Gu, J. Z. Lin and D. X. Yang, Chem. Comm., 1901 (1996).
134. T. Blasco, J. M. L. Nieto, A. Dejoz and M. I. Vazquez, J. Cat., 157, 271 (1995).
135. T. C. Watling, G. Deo, K. Seshan. I. E. Wachs and J. A. Lercher, Cat. Today, 28, 139 (1996).
136. R. Grabowski, B. Grzybowska, A. Kozlowska, J. Sloczynski, K. Wcislo and Y. Barbaux, Topics in Cat., 3, 277 (1996).
137. A. Galli, J. M. L. Nieto, A. Dejoz and M. I. Vazquez, Cat. Lett., 34, 51 (1995).
138. N. Boisdron, A. Monnier, L. Jalowieckiduhamel and Y. Barbaux, J. Chem. Soc—Faraday Trans., 91, 2899 (1995).
139. G. Busca, V. Lorenzelli, G. Oliveri and G. Ramis, Stud. Surf. Sci. Cat., 82, 253 (1994).
140. S. L. T. Andersson, Appl. Cat. A-Gen., 112, 209 (1994).
141. J. N. Michaels, D. L. Stern and R. K. Grasselli, Cat. Lett., 42 139 (1996).
142. J. N. Michaels, D. L. Stern and R. K. Grasselli, Cat. Lett., 42 135 (1996)
143. B. Zhaorigetu, R. Kieffer and J. P. Hindermann, Stud. Surf. Sci. Cat., 101, 1049(1996).
144. S. Derossi, M. Lojacono, M. Gardini and P. Porta, J. Cat., 146, 126 (1994).
145. P. M. Michalakos, M. C. Kung, I. Jahan and H. Kung, J. Cat., 140, 226 (1993).
146. H. H. Kung, P. M. Michalkos, L. Owens, M. Kung, P. Anderson, O. Owen and I. Jahan, ACS Symp. Ser., 523, 389 (1993).
147. G. Belussi, G. Centi, S. Perathoner and F. Trifiro, ACS Symp. Ser., 523, 281 (1993).
148. D. L. Stem and R. K. Grasselli, J. Cat., 167, 550 (1997).
149. L. E. Cadus, M. F. Gomez and M. C. Abello, Cat. Lett., 43, 229 (1997).
150. N. Mizuno, W. Han and T. Kudo, Chem. Lett., 1121 (1996).
151. N. Mizuno and D. J. Suh, Appl. Cat. A-Gen., 146, L249 (1996).
152. R. M. Martinaranda M. F. Portela, L. M. Madeira, F. Freire and M. Oliveira, Appl. Cat. A-Gen., 127, 201 (1995).

153. Y. S. Yoon, W. Ueda and Y. Morooka, Cat. Lett., 35, 57 (1995).
154. Y. S. Yoon, N. Fujikawa, W. Ueda, Y. Morooka and K. W. Lee, Cat. Today, 24, 327 (1995).
155. K. Bruckman, J. Haber, F. Trifiro, J. C. Vedrine, R. K. Grasselli, H. Idriss and H. Kung, Stud. Surf. Sci. Cat., 75, Part A, 741 (1993).
156. F. C. Meunier, A. Yasmeen and J. R. H. Ross, Abs. Papers Amer. Chem. Soc., 211, Pt 1, 184-Coll. (1996).
157. S. S. Bharadwaj, C. Yokoyama and L. D. Schmidt, Appl. Cat. A-Gen., 140, 73 (1996).
158. C. Yokoyama, S. S. Bharadwaj and L. D. Schmidt, Cat. Lett., 38, 181 (1996).
159. D. K. Goetsch, P. M. Witt and L. D. Schmidt, ACS Symp. Series, 638, 124 (1996).
160. M. Huff and L. D. Schmidt, J. Cat., 155, 82 (1995).
161. M. Huff and L. D. Schmidt, J. Cat., 149, 127 (1994).
162. M. Huff and L. D. Schmidt, J. Phys. Chem., 97, 11815 (1993)
163. S. S. Bharadwaj and L. D. Schmidt, J. Cat., 155, 403 (1995).
164. G. Busca, E. Finocchio, V. Lorenzelli, M. Trombetta and S. A. Rossini, J. Chem Soc.,—Faraday Trans., 92, 4687 (1996).
165. G. H. Yi, T. Hayakawa, A. G. Andersen, K. Suzuki, S. Mamakawa, A. P. E. York, M. Shimizu and K. Takehira, Cat. Lett., 38, 189 (1996).
166. S. R. Mirzabekova and A. K. Mamedov, Kin. Cat., 35, 834 (1994).
167. A. Aboukis, M. Loukah and J. C. Vedrine, React. Kin. Cat. Lett., 53, 107 (1994).
168. L. X. Tao, L. S. Wang, M. S. Xie, G. F. Xu and X. L. Wang, React. Kin. Cat. Lett., 53, 205 (1994).
169. M. A. Uddin, T. Komatsu and T. Yashima, J. Cat., 150, 439 (1994).
170. O. V. Krylov, A. Kh. Mamedov and S. R. Mirzabekova, Ind. Eng. Chem. Res., 34, 474 (1995).
171. H. Nagata and T Inui, Appl. Cat. A-Gen., 94, 17 (1993).
172. T. Ioannides and G. R. Gavalas, J. Memb Sci., 77, 207 (1993).
173. E. Vansteen, H. Schnobel and T. C. O'Connor, ACS Symp Series, 638, 276 (1996).
174. W. Ueda, S. W. Lin and I. Tohmoto, Cat. Lett., 44, 241 (1997).
175. F. Cavani, M. Koutryev and F. Trifiro, Cat. Today, 24, 365 (1995).
176. X. P. Zhou, S. Q. Zhou, W. D. Zhang, Z. S. Chao, W. Z. Weng, R. Q. Long, D. L. Tang, H. Y. Wang, S. J. Wang, J. X. Cai, H. L. Wan and K. R. Tsai, "Methane and Alkane Conversion Chemistry, M. M. Bhasin, ed., Plenum Press NY, 19 (1995).
177. H. L. Wan, Z. S. Chao, W. Z. Weng, X. P. Zhou, J. X. Cai and K. R. Tsai, Cat. Today, 30, 67 (1996).
178. R. Burch, S. Chalker, P. Loader, H. lariss, P. Tetenyi, V. Ragaini, R. W. Joyner, J. H. Lunsford, E. Bordes and J. B. Moffat, Stud. Surf. Sci. Cat., 75, Pt B, 1079 (1993).
179. G. Colorio, J. C. Vedrine, A. Auroux and B. Bonnetot, Appl. Cat. A-Gen., 137, 55 (1996).
180. O. V. Buyevskaya, M. Kubik and M. Baerns, Abs. Papers Amer. Chem. Soc., 211, Pt1, 182-Coll (1996).
181. K. Otsuka, T. Ando, S. Suprapto, Y. Wang, K. Ebitani and I. Yamanaka, Cat. Today, 24, 315 (1995).
182. D. J. Wang, M. T. Xu, C. L. Shi and J. H. Lunsford, Cat. Lett., 18, 323 (1993).
183. J. Coronas, M. Menendez and J. Santamaria, Ind. Eng. Chem. Res., 34, 4229 (1995).
184. A. S. Chellappa and D. S. Viswanath, Ind. Eng. Chem. Res., 34, 1933 (1995).
185. N. D. Spencer and C. J. Pereira, AIChE J., 33, 1808 (1987).
186. N. D. Spencer, J. Cat., 109, 187 (1988).
187. M. D. Amiridis, J. E. Rekoske, J. A. Dumesic, D. P. Rudd, N. D. Spencer and C. J. Pereira, AIChE J., 37, 87 (1991).
188. M. A. Banares, N. D. Spencer, M. D. Jones and I. E. Wachs, J. Cat., 146, 204 (1994).
189. N. D. Spencer and C. J. Pereira, J. Cat., 116, 399 (1989).
190. M. D. Amiridis, J. E. Rekoske, J. A. Dumesic, D. F. Rudd, N. D. Spencer and C. J. Pereira, AiChE J., 37, 87 (1991).

We claim:

1. A catalytic membrane reactor which comprises:
    an oxidation zone and a reduction zone separated by a gas-impermeable membrane which has an oxidation surface in contact with said oxidation zone and a reduction surface in contact with said reduction zone;
    an adherent catalyst layer on said oxidation surface of said membrane;
    a three-dimensional catalyst in said oxidation zone
        wherein said membrane is a single-phase mixed ionic and electronic conducting ceramic, and said adherent catalyst and said three-dimensional catalyst promote an oxidation reaction.

2. The catalytic membrane reactor of claim 1 wherein said adherent catalyst and said three-dimensional catalyst promotes a partial oxidation of a hydrocarbon.

3. The catalytic membrane reactor of claim 1 wherein said membrane ceramic has the formula:

$$A_{2-x}A'_xB_{2-y}B'_yO_{5+z}$$

where A is an alkaline earth metal ion or mixture of alkaline earth metal ions; A' is a metal ion or mixture of metal ions where the metal is selected from the group consisting of metals of the lanthanide series and yttrium; B is a metal ion or mixture of metal ions wherein the metal is selected from the group consisting of 3d transition metals, and the group 13 metals; B' is a metal ion or mixture of metal ions where the metal is selected from the group consisting of the 3d transition metals, the group 13 metals, the lanthanides and yttrium; x and y are, independently of each other, numbers greater than or equal to zero and less than or equal to two; and z is a number that renders the ceramic material charge neutral.

4. The catalytic membrane reactor of claim 1 wherein said adherent catalyst layer is a mixed ionic and electronic conducting ceramic having the formula:

$$X_aRe_{1-a}Z_bZ'_{1-b}O_c$$

where X is Ca, Sr, Ba or mixtures thereof, Re is a rare earth or lanthanide metal, including Yttrium, or mixtures thereof; Z is Al, Ga, In or mixtures thereof; Z' is Cr, Mn, Fe, or Co or mixtures thereof; $0 \leq a \leq 1$, $0 \leq b \leq 1$ and c is a number, dependent upon the oxidation states of the other components, and the values of a and b, that renders the composition charge neutral.

5. The catalytic membrane reactor of claim 1 wherein said adherent catalyst layer is a mixed ionic and electronic conducting ceramic having the formula:

$$M/X_aRe_{1-a}Z_bZ'_{1-b}O_c$$

where X is Ca, Sr, Ba or mixtures thereof, Re is a rare earth or lanthanide metal, including Yttrium, or mixtures therof; Z is Al, Ga, In or mixtures thereof; Z' is Cr, Mn, Fe, or Co, or mixtures thereof; $0 \leq a \leq 1$, $0 \leq b \leq 1$ and c is a number, dependent upon the oxidation states of the other components, and the values of a and b, that renders the composition charge neutral; M is a metal selected from Ni, Pt, Pd, Rh, Ir, Ag or mixtures thereof wherein the weight percent of metal to mixed conducting catalyst ranges from about 1 wt % to about 50 wt %.

6. The catalytic membrane reactor of claim 1 further comprising an oxygen reduction catalyst layer on the reduction surface of said membrane.

7. The catalytic membrane reactor of claim 6 wherein said oxygen reduction catalyst is $La_aSr_{1-a}CoO_{3-x}$, where a is a number such that $0 \leq a \leq 1$ and x is a number such that the compound is charge neutral.

8. The catalytic membrane reactor of claim 6 wherein said oxygen reduction catalyst is a metal selected from Ag, Pt or Pd.

9. The catalytic membrane reactor of claim 6 wherein said oxygen reduction catalyst is a catalyst of the formula: $ACo_{1-x}M_xO_{3-\delta}$, where A is Ca, Sr, Ba or combinations thereof, x is a number less than 1 and $\delta$ is a number that renders the catalyst charge neutral; M is a metal ion with empty metal $e_g$ orbitals and filled metal $t_{2g}$ orbitals.

10. The catalytic membrane reactor of claim 1 wherein the membrane ceramic has the formula:

$$A_{2-x}La_xB_{2-y}Fe_yO_{5+z}$$

where A is an alkaline earth metal ion or mixture of alkaline earth metal ions, B is a metal ion or mixture of metal ions where the metal is selected from the group consisting of the 3d transition metals, or the group 13 metals; x and y, independently of one another, are numbers greater than zero and less than 2, and z is a number that renders the ceramic charge neutral.

11. The catalytic membrane reactor of claim 1 wherein the three-dimensional catalyst is a packed-bed catalyst.

12. The catalytic membrane reactor of claim 1 wherein the three-dimensional catalyst is a metal supported on an inert oxide or supported on a mixed ionic and electronic conducting oxide.

13. The catalytic membrane reactor of claim 1 wherein the adherent catalyst layer and the three-dimensional catalyst are selected from catalysts that promote the partial oxidation of methane to CO and hydrogen.

14. The catalytic membrane reactor of claim 1 wherein the adherent catalyst layer and the three-dimensional catalyst are selected from catalysts that promote the partial oxidation of hydrocarbons to oxygenated species.

15. The catalytic membrane reactor of claim 1 wherein the adherent catalyst layer and the three-dimensional catalyst are selected from catalysts that promote the partial oxidation of hydrocarbons to epoxides.

16. The catalytic membrane reactor of claim 1 wherein the adherent catalyst layer and the three-dimensional catalyst are selected from catalysts that promote the oxidative dehydrogenation of alkanes.

17. The catalytic membrane reactor of claim 1 wherein the adherent catalyst layer and the three-dimensional catalyst are selected from catalysts that promote the oxidative coupling of methane.

18. The catalytic membrane reactor of claim 1 wherein said adherent catalyst layer protects the membrane from decomposition.

19. The catalytic membrane reactor of claim 1 wherein the three-dimensional catals is a packed-bed catalyst, a moving-bed, an entrained-bed or a fluidized-bed catalyst.

20. The catalytic membrane reactor of claim 1 wherein the three-dimensional catalyst is a fluidized-bed catalyst.

21. The catalytic membrane reactor of claim 1 wherein the membrane ceramic has the formula:

$$Sr_{2-x}La_xGa_{2-y}C_yO_{5+z}$$

where C is Fe, Cr, or Mn and x and y are numbers greater than zero and less than two, and z is a number that renders the membrane ceramic charge neutral.

22. The catalytic membrane reactor of claim 1 wherein, in the formula of the membrane ceramic, x is greater than zero and less than one.

23. The catalytic membrane reactor of claim 1 wherein, in the formula of the membrane ceramic, y is greater than or equal to 1 and less than two.

24. The catalytic membrane reactor of claim 23 wherein, in the formula of the membrane ceramic, x is greater than zero and less than one.

25. The catalytic membrane reactor of claim 1 wherein the membrane ceramic has the formula:

$$Sr_{2-x}La_xGa_{2-y}Fe_yO_{5+z}$$

where x and y are numbers greater than zero and less than two, and z is a number that renders the membrane ceramic charge neutral.

26. The catalytic membrane reactor of claim 1 wherein, in the formula of the membrane ceramic, B' is Co, Ti, V, Cr, Mn, Ni or Fe or mixtures thereof.

27. The catalytic reactor membrane of claim 3 wherein x an y are numbers greater than zero and less than two.

28. The catalytic membrane reactor of claim 10 wherein B is Ga or Al.

29. The catalytic membrane reactor of claim 12 wherein the metal of the three-dimensional catalyst is Ni, Pt, Pd, Rh, Ir, Ag or combinations thereof.

30. The catalytic membrane reactor of claim 12 wherein the three-dimensional catalyst is Ni on $La_{0.8}Sr_{0.2}MnO_3$.

31. The catalytic membrane reactor of claim 1 wherein the three-dimensional catalyst is the same material as the adherent catalyst.

32. The catalytic membrane reactor of claim 1 wherein the three-dimensional catalyst is a packed-bed of Ni on $Al_2O_3$.

33. The catalytic membrane reactor of claim 1 which comprises a plurality of gas-impermeable membranes.

34. A catalytic membrane reactor which comprises:
   an oxidation zone and a reduction zone separated by a gas-impermeable membrane which has an oxidation surface in contact with said oxidation zone and a reduction surface in contact with said reduction zone;
   an adherent catalyst layer on said oxidation surface of said membrane to protect said membrane from decomposition.

* * * * *

UNITED STATES PATENT AND TRADEMARK OFFICE
CERTIFICATE OF CORRECTION

PATENT NO. : 6,355,093 B1
DATED : March 12, 2002
INVENTOR(S) : Schwartz et al.

It is certified that error appears in the above-identified patent and that said Letters Patent is hereby corrected as shown below:

Title page,
Item [56], OTHER PUBLICATIONS, "Teraoka, Y. et al." reference please replace "$La_{1-x}Sr_xCo_{1-y}Fe_yO_2$" with -- $La_{1-x}Sr_xCo_{1-y}Fe_yO_3$ --.

Column 2,
Line 37, please insert -- is -- between "FIG. 1" and "illustrated".
Line 48, please replace "oxygen anion" with -- oxygen anions --.

Column 3,
Line 8, please replace "O." with -- O• --.
Formula I, approximately line 45, please replace "$A_{2-x}A'_xB'_yO_5+z$" with -- $A_{2-x}A'_xB'_yO_{5+z}$ --.
Line 58, please replace "member" with -- number --.

Column 4,
Line 33, please replace "alkane" with -- alkanes --.
Line 42, please replace "catalysts" with -- catalyst --.

Column 5,
Line 27, please replace "air.." with -- air, --.
Line 50, after " 'oxygen containing gas' ", please insert -- and --.

Column 6,
Line 33, please replace "optional" with -- optionally --.

Column 7,
Line 4, please replace "oxidations surface" with -- oxidation surface --.

Column 8,
Lines 6-7, please delete "Table 1 provides lattice parameters for a number of brownmillerite materials of this invention".
In the formula at approximately line 20, please replace "$I_A$" with -- $r_A$ --.

Column 9,
Line 38, please replace "olefms" with -- olefins --.

UNITED STATES PATENT AND TRADEMARK OFFICE
CERTIFICATE OF CORRECTION

PATENT NO. : 6,355,093 B1
DATED : March 12, 2002
INVENTOR(S) : Schwartz et al.

It is certified that error appears in the above-identified patent and that said Letters Patent is hereby corrected as shown below:

Column 10,
Line 7, please replace "catalyst" with -- catalysts --.

Column 13,
Line 9, please replace "$Al_{2O3}$" with -- $Al_2O_3$ --.

Column 14
Line 29, please replace "were" with -- was --.

Column 18
Line 62, please replace " $Al_2O_3$, sepiolite hydrotalcite" with
-- $Al_2O_3$, sepiolite hydrotalcite --.

Column 19
Line 23, please replace " $Al_2O_3$ in fluidized bed and" with -- $Al_2O_3$ in fluidized bed and --.
Line 40, please replace "$SrBi_3O_4Cl_3$ and" with -- $SrBi_3O_4Cl_3$ and --.
Line 58, please replace "Alakli" with -- Alkali --.

Column 20
Line 24, please replace "abd" with -- and --.

Column 26
Line 5, claim 19, please replace "catals" with -- catalyst --.
Line 37, claim 27, please replace "an" with -- and --.

Signed and Sealed this

Twenty-first Day of January, 2003

JAMES E. ROGAN
*Director of the United States Patent and Trademark Office*